US009304991B2

United States Patent
Chao et al.

(10) Patent No.: US 9,304,991 B2
(45) Date of Patent: Apr. 5, 2016

(54) METHOD AND APPARATUS FOR USING MONITORING INTENT TO MATCH BUSINESS PROCESSES OR MONITORING TEMPLATES

(75) Inventors: Tian J. Chao, Bedford, NY (US); Sreeram Ramakrishnan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/696,492

(22) Filed: Jan. 29, 2010

(65) Prior Publication Data

US 2011/0191351 A1 Aug. 4, 2011

(51) Int. Cl.
*G06F 17/30* (2006.01)
*G06Q 10/06* (2012.01)

(52) U.S. Cl.
CPC .......... *G06F 17/30* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 2003/0167209 | A1* | 9/2003 | Hsieh | 705/26 |
| 2004/0064353 | A1* | 4/2004 | Kim et al. | 705/8 |
| 2005/0038809 | A1* | 2/2005 | Abajian et al. | 707/102 |
| 2006/0095473 | A1* | 5/2006 | Fox | 707/104.1 |
| 2007/0168349 | A1* | 7/2007 | Sanghvi et al. | 707/10 |
| 2009/0171729 | A1 | 7/2009 | Anisimov et al. | |
| 2009/0234727 | A1* | 9/2009 | Petty | 705/14 |

OTHER PUBLICATIONS

Chowdhary et al., "Model Driven Development for Business Performance Management," IBM Systems Journal (Apr. 2006).
Chao et al., "Artifact-Based Transformation of IBM Global Financing, A Case Study," BPM2009 (Sep. 2009).

* cited by examiner

*Primary Examiner* — Jay Morrison
(74) *Attorney, Agent, or Firm* — Ryan, Mason & Lewis, LLP

(57) ABSTRACT

Methods and apparatus are provided for using monitoring intent to match business processes or monitoring templates. One or more business processes and monitoring templates are identified by obtaining at least one business process or monitoring template, wherein at least one of the obtained business process or monitoring template has an associated monitoring intent comprising one or more monitoring keywords; obtaining a user-specified monitoring intent from the user, the user-specified monitoring intent comprising one or more search keywords; assigning a score to at least one of the obtained business process or monitoring template, wherein the score is based on a matching of one or more of the monitoring keywords from the associated monitoring intent with the search keywords of the user-specified monitoring intent; and identifying the one or more of the plurality of business processes and the plurality of monitoring templates based on the assigned score. The business processes and monitoring templates each have a plurality of keywords and a weighted score is optionally assigned to each of the plurality of keywords. The assigned score is based, for example, on a weighted score of matching keywords. A ranked list is optionally generated.

27 Claims, 23 Drawing Sheets

FIG. 3
PRIOR ART

| DEAL BY USER (DEAL LEVEL) | BUSINESS SUPPORT OP EXEC | PRICING EXEC | CREDIT EXEC | SALES EXEC | ACCOUNTING EXEC |
|---|---|---|---|---|---|
| PROCESS PERSPECTIVE | | | | | |
| TOTAL NUMBER OF DEAL (BY AN ATTRIBUTE) | X | X | X | X | |
| TURNAROUND TIME (TAT) OF A DEAL (E2E) | X | | | X | X |
| AVERAGE TURNAROUND TIME (ATAT) OF A DEAL | X | | | X | X |
| FINANCIAL PERSPECTIVE | | | | | |
| WIN RATE | X | X | | X | X |
| CUSTOMER PERSPECTIVE | | | | | |
| TOTAL NEW CLIENT | X | X | X | X | X |
| LEARNING AND GROWTH PERSPECTIVE | | | | | |
| PRODUCTIVITY RATE | X | | | | |

| | | | | |
|---|---|---|---|---|
| ▶ XML | | | | |
| <!-- Comment | edited with XMLSPY v5 rel. 4U (http://www.xmlspy.com) by chao (IBM) | | | |
| <!-- Comment | Sample XML file generated by XMLSPY v5 rel. 4U (http://www.xmlspy.com) | | | |
| ▲ Monitoring Template | | | | |
| | = xmlns:xsi | http://www.w3.org/2001/XMLSchema-instance | | |
| | = xsi:noNamespac... | C:\d_drive\gcb\patent\2008\BPMTemplates\monitoringIntent.xsd | | |
| | ▲ MonitoringHeader | | | |
| | ▲ BusinessProcessMonitoringIntent | | | |
| | | <> sector | "Finance" | |
| | | <> industry | "Leasing" | |
| | | <> monIntent | "(Grow new customers and volume in SMB market; Financial perspective/ Expand revenue opportunities, Internal Process perspective/ operational management processes; total_new_SMB_customers/ total_SMB_transaction_volume)?" | |
| | | <> user-definedKe... | "smallDollarAmount" | |
| | | <> processTaskKe... | "deal" | |
| | | <> industryStandar... | "leasing" | |
| | | <> roleKeyword | "Credit Exec, Pricing Exec, Credit Exec, Sales Exec" | |
| | | <> artifactKeyword | "Deal" | |
| <> MonitorModel | Text | | | |

1500, 1510 Monitoring Template, 1520 MonitoringHeader, 1530 BusinessProcessMonitoringIntent, 1540 monIntent

```xml
<?xml version="1.0" encoding="UTF-8"?>
<!-- edited with XMLSPY v5 rel. 4 U (http://www.xmlspy.com) by chao (IBM) -->
<MonitoringTemplate xmlns:xsi="http://www.w3.org/2001/XMLSchema-instance"
xsi:noNamespaceSchemaLocation="C:\d_drive\gcb\patent\2008BPMTemplates\monitoringIntent.xsd">
    <MonitoringHeader>
        <BusinesProcessMonitoringIntent>
```

1610
```
            <monIntent>"Grow volume in Service Delivery; Internal Process perspective/ operational
management processes; turnaround Time, volume, status, age)"</monIntent>
            <sector>"Technology"</sector>
            <industry>"Service Delivery"</industry>
            <processTaskKeyword>"Create, Approve, plan, cancel, pending, execute,
complete"</processTaskKeyword>
            <roleKeyword>"Service Owner, Project Exec, Service Delivery Manager"</roleKeyword>
```

1620
```
            <artifactKeyword>"ServiceOrder,ServiceOrderTask"</artifactKeyword>
            <industryStandardKeyword>"Service Order"</industryStandardKeyword>
            <user-definedKeyword>"Service Catalog"</user-definedKeyword>
        </BusinesProcessMonitoringIntent>
    </MonitoringHeader>
    <monitoringModel ID="ID000010" name="String" description="String" >
<bizEvent id="ID000061" name="soStartEvt" description="Service Order Start Event">
        <ca:eventMessage dataitemId="ID000662">
```

1630
```
            <ca:dataField xpath="sold"/>
            <ca:dataField xpath="soCategory"/>
            <ca:dataField xpath="soStartTime"/>
        </ca:eventMessage>
        <ca:expression>String</ca:expression>
</bizEvent>
```

1635
```
<metric id="ID000022" name="sold" description="Service Order Id">
    <ca:expression>soStartEvt.sold</ca:expression>
</metric>
<metric id="ID000023" name="soCategory" description="Service Order Category">
    <ca:expression>soStartEvt.soCategory</ca:expression>
</metric>
<metric id="ID000023" name="soStartTime" description="Service Order Starttime">
    <ca:expression>soStartEvt.soStartTime</ca:expression>
</metric>
<metric id="ID000023" name="soEndTime" description="Service Order Starttime">
    <ca:expression>soEndEvt.soEndTime</ca:expression>
</metric>
```

1640
```
<KPI id="ID000021" name="soTAT" description="Service Order TAT">
    <ca:expression>soStartTime - soEndTime</ca:expression>
    <ca:result>2.56</ca:result>
    <ca:interval>4min</ca:interval>
    <ca:gatingCondition>soCompletedSit == true</ca:gatingCondition>
    <generateExtService>1</generateExtService>
    <serviceName>soTATService</serviceName>
</KPI>
```

1645
```
<situation id="ID000031" name="soCompletedSit" description="Service Order Completed Situation">
    <ca:expression>soCompletedEvtArrived</ca:expression>
</situation>
```

| TYPE OF MATCH (ELEMENT NAME OF 'BusinessProcessMonitoringIntent') | WEIGHTS/SCORES |
|---|---|
| monIntent | 2 FOR EACH MATCHED ELEMENT OF A TUPLE 1 FOR EACH PARTIALLY MATCHED ELEMENT |
| sector | 4 |
| industry | 3 |
| processTakKeyword | 2 |
| roleKeyword | 2 |
| artifactKeyword | 2 |
| industryStandardKeyword | 2 |
| user-definedKeyword | 2 |

| ELEMENT NAME OF 'BusinessProcessMonitoringIntent' | VALUE (ONE OR MORE VALUES) | SUB-TOTAL (WEIGHTS/SCORES) (FULLY MATCHED AND PARTIALLY MATCHED) |
|---|---|---|

METHOD AND APPARATUS FOR USING MONITORING INTENT TO MATCH BUSINESS PROCESSES OR MONITORING TEMPLATES

CROSS-REFERENCE TO RELATED APPLICATIONS

The present application is related to United States patent applications entitled "Method and Apparatus for Specifying Monitoring Intent of a Business Process or Monitoring Template" and "Method and Apparatus for Creating a Monitoring Template for a Business Process," each filed contemporaneously herewith and incorporated by reference herein.

FIELD OF THE INVENTION

The present invention relates generally to techniques for business process modeling and monitoring and, more particularly, to techniques for reusing existing business process modeling and monitoring systems.

BACKGROUND OF THE INVENTION

Enterprises increasingly rely on business process models to systematically describe business operations. Enterprises develop business process models to create, organize, and implement business plans that solve problems or exploit business opportunities. A business process model typically defines the ways in which operations are carried out to accomplish the intended objectives of an enterprise.

Business performance monitoring and management creates a window into an enterprise and allows the performance of the enterprise to be monitored. The monitoring of business processes typically encompasses the tracking of one or more individual processes, so that process state information, including performance statistics, can be collected and reported. Key Performance Indicators (KPIs), for example, are indicators that allow an enterprise to achieve organizational goals through the definition and measurement of progress. KPIs and other performance statistics can be monitored and compared to predefined criteria to trigger alerts, when needed, for situations requiring attention. For example, the tracking of a customer order allows the state of the order to be determined so that problems can be identified and corrected.

Business processes and the corresponding monitoring models are typically complex systems that require significant enterprise-level effort to generate and maintain. In addition, a unique business process and corresponding monitoring model are typically created for each problem. While there may be one or more existing business processes and/or corresponding monitoring models that could be leveraged in the creation of a new business process and/or monitoring model, there is currently no systematic way to describe existing business processes and/or corresponding monitoring models or to search for existing business processes and/or corresponding monitoring models.

Thus, there is a significant need for a mechanism for systematically describing existing business processes and/or corresponding monitoring models. In addition, a further need exists for a mechanism for searching for existing business processes and/or corresponding monitoring models.

SUMMARY OF THE INVENTION

Generally, methods and apparatus are provided for using monitoring intent to match business processes or monitoring templates. According to one aspect of the invention, one or more of a plurality of business processes and a plurality of monitoring templates are identified by obtaining at least one of the plurality of business processes and the plurality of monitoring templates, wherein at least one of the obtained business process and the obtained monitoring template has an associated monitoring intent comprising one or more monitoring keywords; obtaining a user-specified monitoring intent from the user, the user-specified monitoring intent comprising one or more search keywords; assigning a score to at least one of the obtained business process and the monitoring template, wherein the score is based on a matching of one or more of the monitoring keywords from the associated monitoring intent with the search keywords of the user-specified monitoring intent; and identifying the one or more of the plurality of business processes and the plurality of monitoring templates based on the assigned score.

The business processes and monitoring templates each have a plurality of keywords and a weighted score is optionally assigned to each of the plurality of keywords. The assigned score is based, for example, on a weighted score of matching keywords. A total score is a sum of weighted scores of the matching keywords. The matching keywords may comprise, for example, exact matching keywords and partial matching keywords.

A ranked list is optionally generated of the one or more of the plurality of business processes and the plurality of monitoring templates based on the score. The ranked list can be presented, for example, in descending order of the assigned score.

A more complete understanding of the present invention, as well as further features and advantages of the present invention, will be obtained by reference to the following detailed description and drawings.

BRIEF DESCRIPTION OF THE DRAWINGS

FIG. 3 illustrates an exemplary set of KPIs that are generated by the exemplary business performance monitoring system of FIG. 1 for the exemplary business process of FIG. 2;

FIG. 15 illustrates an exemplary data record for a financial business process that records a monitoring intent as part of a monitoring template in accordance with the present invention;

FIGS. 16A through 16C, collectively, illustrate an exemplary data record for a monitoring template including monitoring intent using XML;

DETAILED DESCRIPTION OF PREFERRED EMBODIMENTS

The present invention provides a mechanism for describing existing business processes and/or corresponding monitoring models and for searching for existing business processes and/or corresponding monitoring models. The present invention provides a customizable process monitoring system based on the specification of the process monitoring intent. As used herein, a monitoring intent captures important monitoring requirements of a business process. The present invention thus provides a mechanism for capturing the intent of a business process or monitoring model. In addition, the present invention defines appropriate monitoring elements into a template format for different hierarchies of decision makers while accommodating monitoring requirements for practitioners in different focusing areas, e.g., lean sigma practitioners.

Business Performance Monitoring and Management

As previously indicated, business process models are used to create, organize, and implement business plans. Business performance monitoring and management allows enterprise performance to be monitored. Business performance monitoring involves the collection and reporting of process state information, including performance statistics. KPIs and other performance statistics can be monitored and compared to predefined criteria to trigger alerts. In this manner, business performance monitoring and management provides real-time visibility to business performance.

Figure 1:
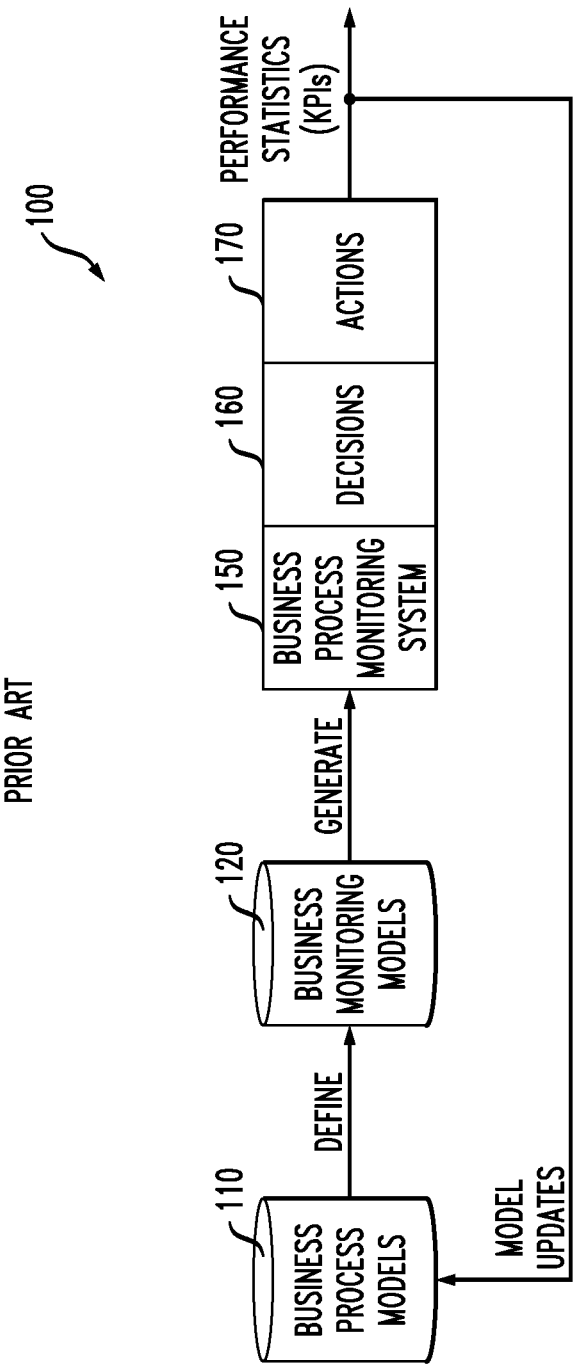
FIG. 1 illustrates a conventional business performance monitoring system in which the present invention can be employed.

FIG. 1 illustrates a conventional business performance monitoring system 100 in which the present invention can be employed. As shown in FIG. 1, the business performance monitoring system 100 employs one or more business monitoring models 120 to generate run-time business process monitoring system 150 that monitor one or more business processes based on business process models 110. Generally, the business process models 110 are analyzed to define the problems to be monitored and to identify the business process requirements.

A run-time business process monitoring system 150 is generated based on the monitoring model 120. The run-time business process monitoring system 150 is employed to gather data regarding the corresponding business process(es), in a known manner. The business process monitoring system 150 is typically tailored to one or more particular business processes being monitored to capture real-time data about the particular business process being monitored. Generally, the business process monitoring system 150 will perform one or more of the following tasks: process input event data, filter data, correlate data and compute KPIs. In addition, a decision block 160 may implement one or more rules to detect situations and trigger one or more predefined actions warranting real-time attention. The predefined actions are implemented in the exemplary embodiment by an action block 170.

Generally, the business process monitoring system 150 collects data for one or more states of the business process. For an exemplary order monitoring system, the business process monitoring system 150 can collect data, for example, regarding order creation, status update events and order completion. In addition, the business process monitoring system 150 can determine statistics for one or more states of the business process and trigger a response by the same or another business process (e.g., if an order is late).

For a more detailed discussion of business process models 110, business monitoring models 120 and business process monitoring systems 150, see, e.g., S. Kapoor et al., "Sense-and-Respond Supply Chain Using Model-Driven Techniques," IBM Systems Journal, Enterprise On Demand Transformation special issue (Nov. 2007); S. Kumaran et al., "Service Delivery Management Using a Model-Driven Transformational Approach and Service-Oriented Architecture," IBM Systems Journal (June, 2007); Pawan Chowdhary et al., "Model Driven Development for Business Performance Management," IBM Systems Journal (Apr., 2006); or Tian Chao et al., "Artifact-Based Transformation of IBM Global Financing A Case Study," BPM2009 (Sep., 2009), each incorporated by reference herein.

Figure 2:
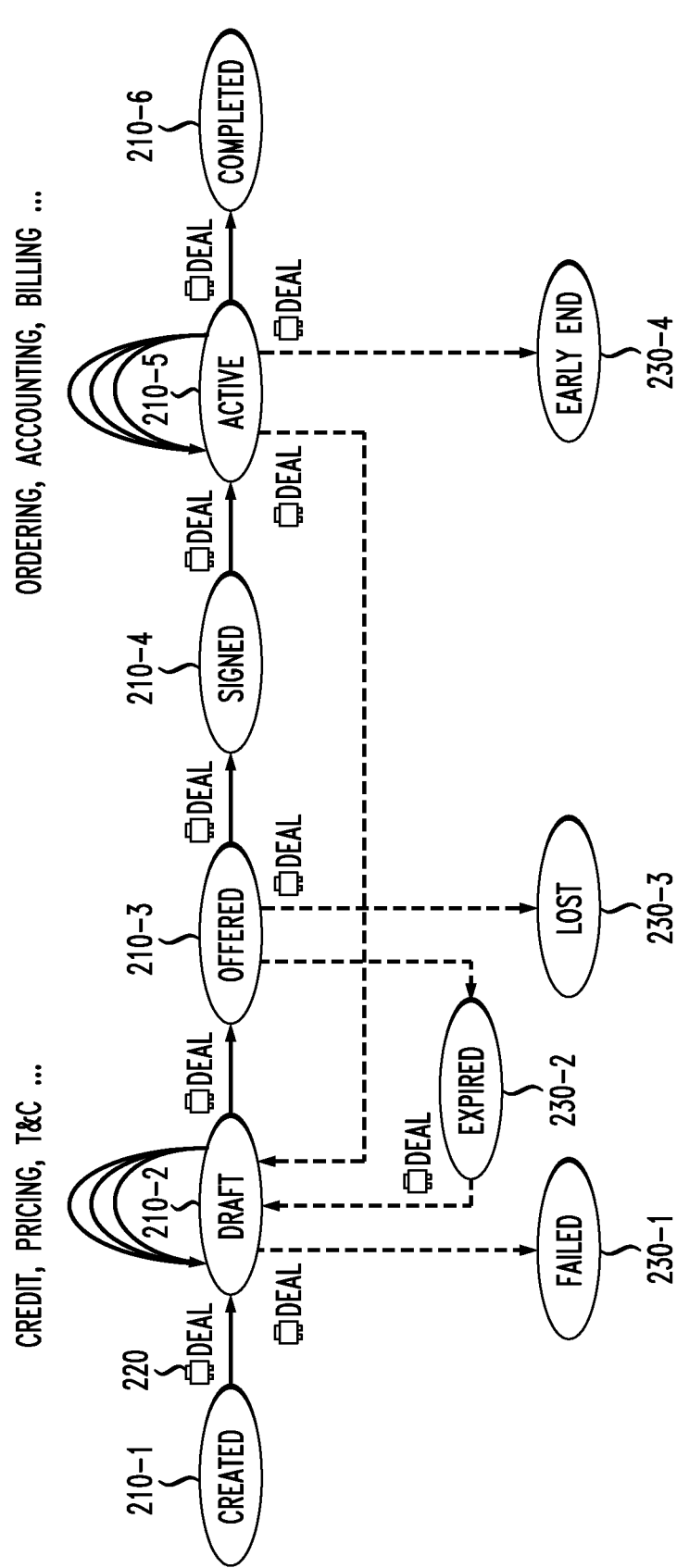
FIG. 2 illustrates an exemplary conventional business process for an illustrative global finance business unit.

FIG. 2 illustrates an exemplary conventional business process 200 for an illustrative global finance business unit. As shown in FIG. 2, the exemplary business process 200 processes one or more deals 220 through a plurality of states 210-1 through 210-6. Throughout the business process 200, the deal 220 can have a status 230-1 through 230-4. For example, during a drafting state 210-2, the credit, pricing and terms and conditions (T&C) of the deal 220 can be addressed. During the drafting state 210-2, the deal 220 can have a status of failed 230-1 or expired 230-2.

FIG. 3 illustrates an exemplary set of KPIs 300 that are generated by the exemplary business performance monitoring system 100 of FIG. 1 for the exemplary business process 200 of FIG. 2. In the exemplary illustration of FIG. 3, the KPIs are generated for the exemplary global finance business unit. For example, the exemplary KPIs 300 might include the total number of deals and turnaround time of deals, and the KPIs are used by specific user roles or persons/stakeholders, e.g., executives in the business unit, such as sales and accounting executives. It is noted that the business process 200 and corresponding KPIs 300 presented in FIGS. 2 and 3 are for illustrative purposes only, and that the present invention can be employed in conjunction with any business process and/or KPIs, as would be apparent to a person of ordinary skill in the art. In general, the business performance monitoring system 100 of FIG. 1 provides real-time data related to the performance of the business process being monitored.

Various aspects of the present invention recognize that one or more existing business processes and/or corresponding monitoring models can often be leveraged in the creation of a new business process and/or monitoring model. Business processes and monitoring models can be searched so that existing business processes and monitoring models that are related to a new business process and/or monitoring model can be identified and possibly reused.

According to one aspect of the present invention, discussed further below in conjunction with FIGS. 4 through 11, a monitoring template is provided that allows one or more existing monitoring models to be reused in the creation of new monitoring models. An exemplary monitoring template schema definition is provided, as discussed further below in conjunction with FIG. 5. The disclosed monitoring templates allow new or existing monitoring models to become reusable monitoring templates that are reused in the creation of new monitoring models. As discussed further below, the disclosed monitoring templates can be searched and matched with business processes.

According to another aspect of the present invention, discussed further below in conjunction with FIGS. 12 through 16, a monitoring intent is associated with one or more of a business process and a corresponding monitoring template. A monitoring intent captures important monitoring requirements of a business process. In this manner, the monitoring intent associated with an existing business process and/or monitoring template can be searched and used to identify existing business processes or monitoring templates that are related to a new business process and/or monitoring model that is being created. The provided monitoring intent enables new or existing business processes and monitoring templates to be searched, matched and scored.

According to a further aspect of the present invention, discussed further below in conjunction with FIGS. 17 through 23, methods and apparatus are provided for searching and matching monitoring models and business processes by matching monitoring intents.

Monitoring Templates

Figure 4:
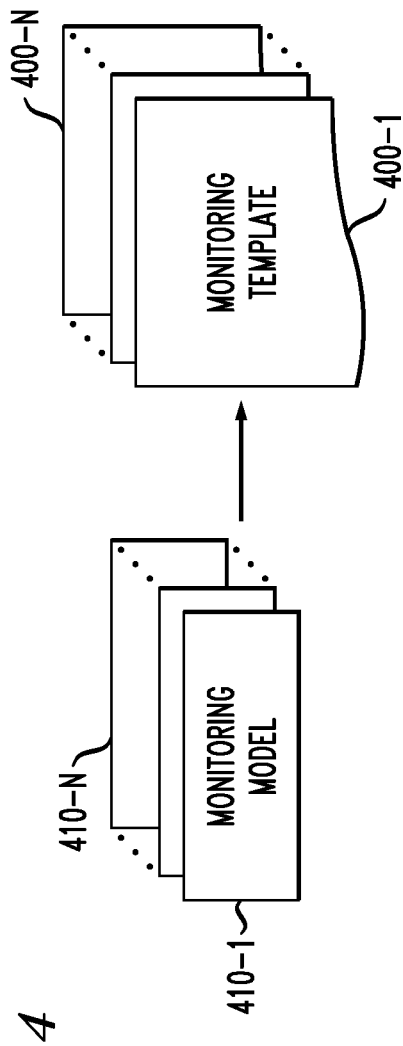
FIG. 4 illustrates a plurality of exemplary monitoring templates that allow one or more existing monitoring models to be reused in the creation of new monitoring models in accordance with the present invention.

FIG. 4 illustrates a plurality of exemplary monitoring templates 400-1 through 400-N that allow one or more existing monitoring models 410-1 through 410-N to be reused in the creation of new monitoring models. The monitoring templates 400 are reused in the creation of new monitoring models. An exemplary schema definition 500 for the monitoring template 400 is discussed further below in conjunction with FIG. 5.

Generally, given one or more business processes or existing monitoring models, one aspect of the present invention will provide one or more corresponding monitoring templates that enable a predefined monitoring framework. As discussed hereinafter, when combined with a monitoring intent, the monitoring templates enable the searching/matching of monitoring templates with business processes. In addition, the disclosed monitoring templates enable downstream transformation of a template to one or more tool-specific formal models for code-generation into deployable code. When an existing monitoring template of interest is identified, the identified monitoring template(s) can optionally be customized for future reuse.

In one exemplary embodiment, a monitoring template defines the monitoring elements that are required for an operational runtime monitoring system and business dashboard. In addition, when combined with a monitoring intent, the disclosed monitoring templates enable existing monitoring models to become reusable monitoring template instances.

Figure 5:
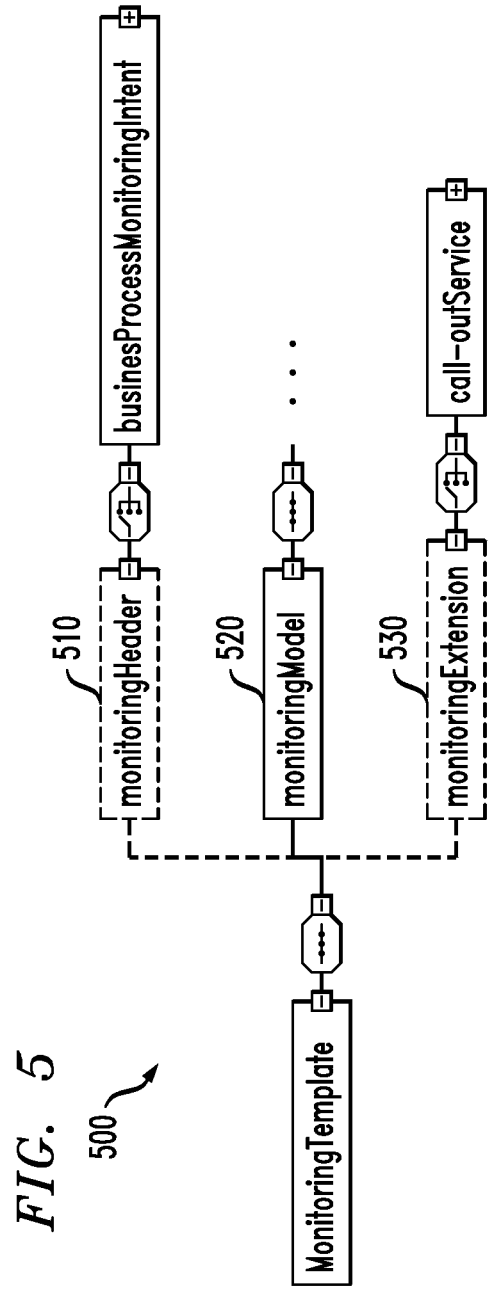
FIG. 5 illustrates an exemplary monitoring template schema definition.

FIG. 5 illustrates an exemplary monitoring template schema definition 500. As shown in FIG. 5, the exemplary monitoring template schema definition 500 comprises an optional monitoring header element 510, a monitoring model element 520 and an optional monitoring extension element 530. An exemplary schema definition 1200 for the monitoring intent is discussed further below in conjunction with FIG. 12.

The optional monitoring header element 510 allows a user to specify the monitoring intent for the monitoring template. As shown in FIG. 5, the exemplary monitoring header element 510 has one element, e.g., a BusinessProcessMonitoringIntent schema. The BusinessProcessMonitoringIntent schema specifies the monitoring intent of a business process and/or of a monitoringTemplate. It can be used as the user's search criteria to compare and search for the desired business processes and/or monitoringTemplates that match the criteria (or monitoring intent).

Exemplary schema definitions for the monitoring model element 520 and optional monitoring extension element 530 are discussed further below in conjunction with FIGS. 6 and 7, respectively. Generally, as discussed further below in conjunction with FIG. 6, the monitoringModel element 520 of the MonitorTemplate schema 500 specifies the various elements comprising a monitoringModel schema, e.g., bizEvent, metric, KPI, situation, and dimensionGroup. The monitoringExtension element 530, discussed further below in conjunction with FIG. 7, of the MonitorTemplate schema 500 specifies the elements comprising call-out Service, which invokes external services by specifying the name of the service called, the parameters to be passed to the called service, the return value, and the protocol used to invoke the service.

Figure 6:
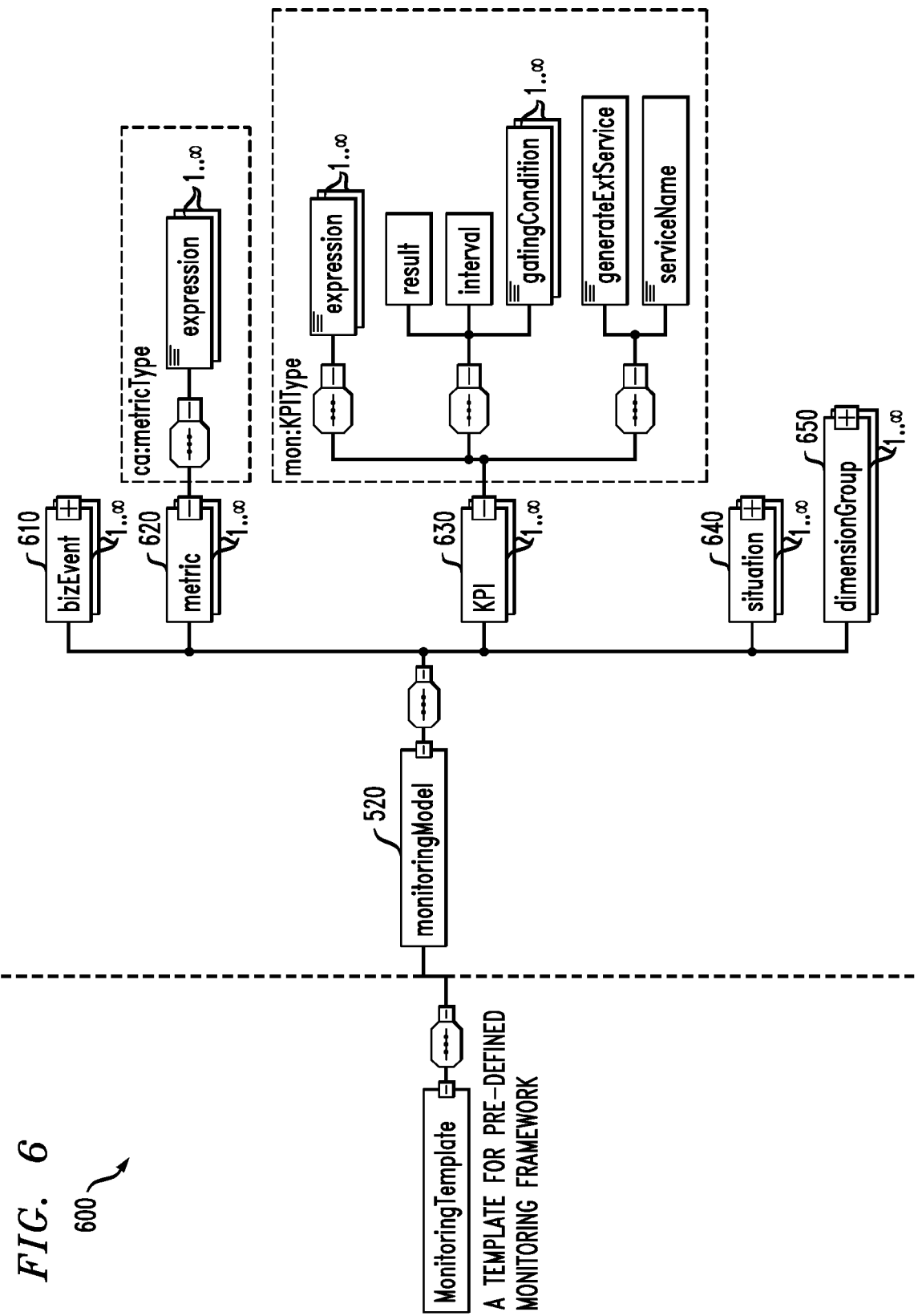
FIG. 6 illustrates an exemplary schema definition for the monitoring model element.

FIG. 6 illustrates an exemplary schema definition for the monitoring model element 520. Generally, the monitoring model element 520 comprises one or more monitoring elements required to generate an operational runtime monitoring system and dashboard, such as those described in U.S. patent application Ser. No. 12/627,071, filed Nov. 30, 2009, entitled "Performance-Aware Enterprise Components," (now U.S. Pat. No. 9,251,491), incorporated by reference herein.

As shown in FIG. 6, the exemplary monitoring model element 520 comprises a business event element 610, a metric element 620, a KPI element 630, a situation element 640 and a dimensions group element 650.

The business event element 610 (bizEvent) presents a business event, that is a data structure that captures input data to the business process. A business event has multiple data fields with its format defined and understood by both the source component of the business process that creates the business event and the target component that processes the event to obtain the input data.

As shown in FIG. 6, the metric element 620 represents a quantifiable measurement or metric of a business process. The value of a metric can come directly from data of an input bizEvent or from the computation of input data and other algorithms. Not all metrics are KPIs (only selected key metrics are KPIs). See also, KPI description below.

For example, "Instance Level" and "Class Level" are types of metrics that can be used to distinguish the measurement scope of the metrics during the monitoring and calculation process. "Instance Level Metric" scope is at component instance level (for example, "CleanCupsNumber" for an EnterpriseComponent instance). "Class Level Metric" will be used to measure aggregated components (for example, some aggregated value: COUNT, AVG, SUM, MAX, MIN etc.).

In addition, KPI element 630 represents a key metric, agreed to beforehand, that reflects the critical success factors of an organization. KPIs are typically used to monitor, manage, and provide visibility to business performance and critical measurements to decision support. KPIs are used to detect exceptions/situations and trigger real-time alerts that in turn can affect proactive corrective actions.

The situation element 640 represents an exceptional condition detected based on the value of a KPI in the business process. For example, a "processing_taking_too_long" situation can be defined to be based on the value of a KPI 'turnaround time (TAT)', and the situation will be detected when TAT is greater than a certain predefined threshold. The situation can optionally be defined to detect the exception proactively and also in real-time as desired. When a situation is detected, one or more alerts can be triggered and delivered to responsible parties to take appropriate action. A "proactive" situation detects a potential exceptional condition before it occurs, e.g., alert before the predefined TAT threshold is reached so that the responsible party can have some time to take corrective actions. A "non-proactive" situation detection would detect and alert after the situation already occurred, e.g., after the predefined TAT threshold is reached, which does not allow time to correct the situation detected. The situation can also trigger actions, such as sending an email, instant message or a telephone call, or start another business process.

The dimensions group element 650 (or "Dimension Definition") describes the category to group "Class Level Metric" (for example, "TotalCups by Owner"), and normally the dimension can be defined by one or more data attributes in information model of the enterprise component. The dimensions group element 650 specifies the elements for use to generate definitions for creating a dimensional database, typically used for Business Intelligence (BI) related functions: such as reporting, dashboard, On-Line Analytical Processing (OLAP), and business performance management. Business Intelligence often aims to support better business decision-making. See, e.g., H. P. Luhn, "A Business Intelligence System" (PDF), IBM Journal (October 1958), downloadable from http://www.researchibm.com/journal/rd/024/ibmrd0204H.pdf. Thus, a BI system can be called a decision support system (DSS). See, e.g., D. J. Power (2007-03-10). "A Brief History of Decision Support Systems, version 4.0," downloadable from http://dssresources.com/history/dsshistory.html.

Each dimensionGroup comprises one "measure" (often referred to as a fact), which is typically a KPI, and one or more dimensions for grouping the "measure" to look at the measure in different ways, e.g., by time (time dimension), by location (geo dimension, such as NorthEast/SouthWest regions, States or City). A dimension is an element of the dimensionGroup, used to generate a "dimension" definition for the measure in the dimensionGroup. Dimension is a grouping of data for use to drill-down on. For example, a time dimension can be defined for several levels, e.g., from top (root) to bottom (leaves): year, month, week, day, where data can be drilled down by year, month, week, day, etc. A measure is also an element of the dimensionGroup, that is used to generate a measure definition (aka. Fact).

Figure 7:
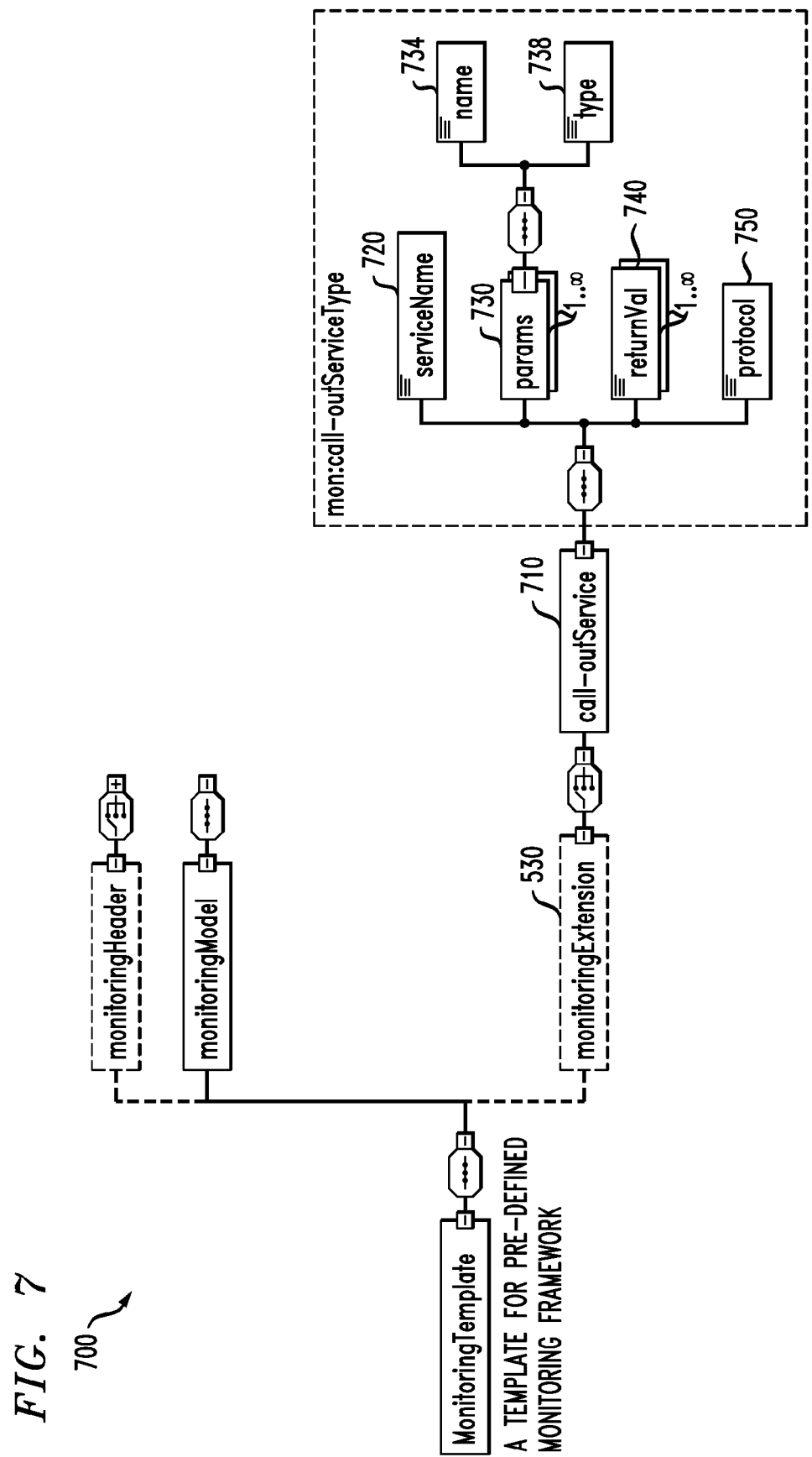
FIG. 7 illustrates an exemplary schema definition for the optional monitoring extension element of FIG. 5.

FIG. 7 illustrates an exemplary schema definition for the optional monitoring extension element 530. The monitoringExtension element 530 of the MonitorTemplate schema 500 of FIG. 5 specifies the elements comprising call-out Service 710, which invoke external services by specifying the name of the service called 720, the parameters 730 to be passed to the called service, the return value 740, and the protocol 750 used to invoke the service. Thus, the optional MonitoringExtensions define call-out services for integration with external functions.

Figure 8:
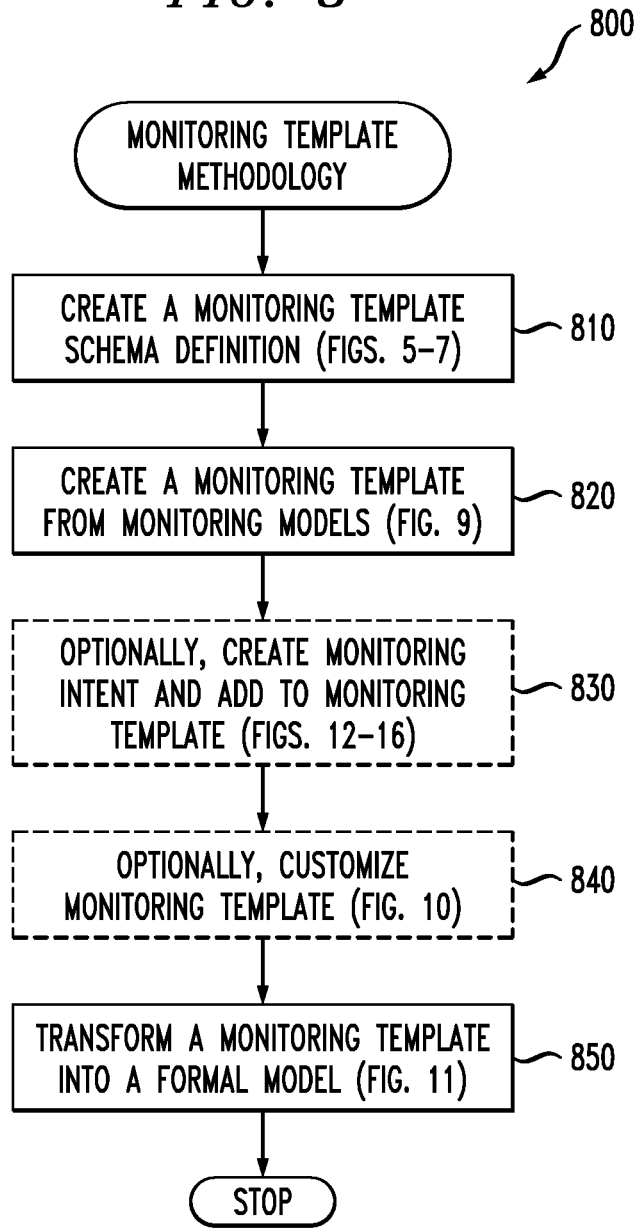
FIG. 8 is a flow chart illustrating an overall exemplary monitoring template methodology incorporating features of the present invention.

FIG. 8 is a flow chart illustrating an overall exemplary monitoring template methodology 800 incorporating features of the present invention. As shown in FIG. 8, the exemplary monitoring template methodology 800 initially creates a monitoring template schema definition during step 810. Exemplary monitoring template schema definitions were discussed above in conjunction with FIGS. 5-7.

Thereafter, the monitoring template methodology 800 creates a monitoring template from the monitoring models during step 820, using the monitoring template creation process 900, discussed further below in conjunction with FIG. 9.

During step 830, the monitoring template methodology 800 optionally creates a monitoring intent, discussed further below in conjunction with FIGS. 12-16, for the monitoring templates created during step 820. The monitoring intent is added to the optional monitoring header element 510 of the monitoring template.

During step 840, the monitoring template methodology 800 optionally customizes the monitoring template using the monitoring template customization process 1000, discussed further below in conjunction with FIG. 10. The monitoring template methodology 800 transforms the monitoring template into a formal model during step 850, using the monitoring template transformation process 1100, discussed further below in conjunction with FIG. 11.

Figure 9:
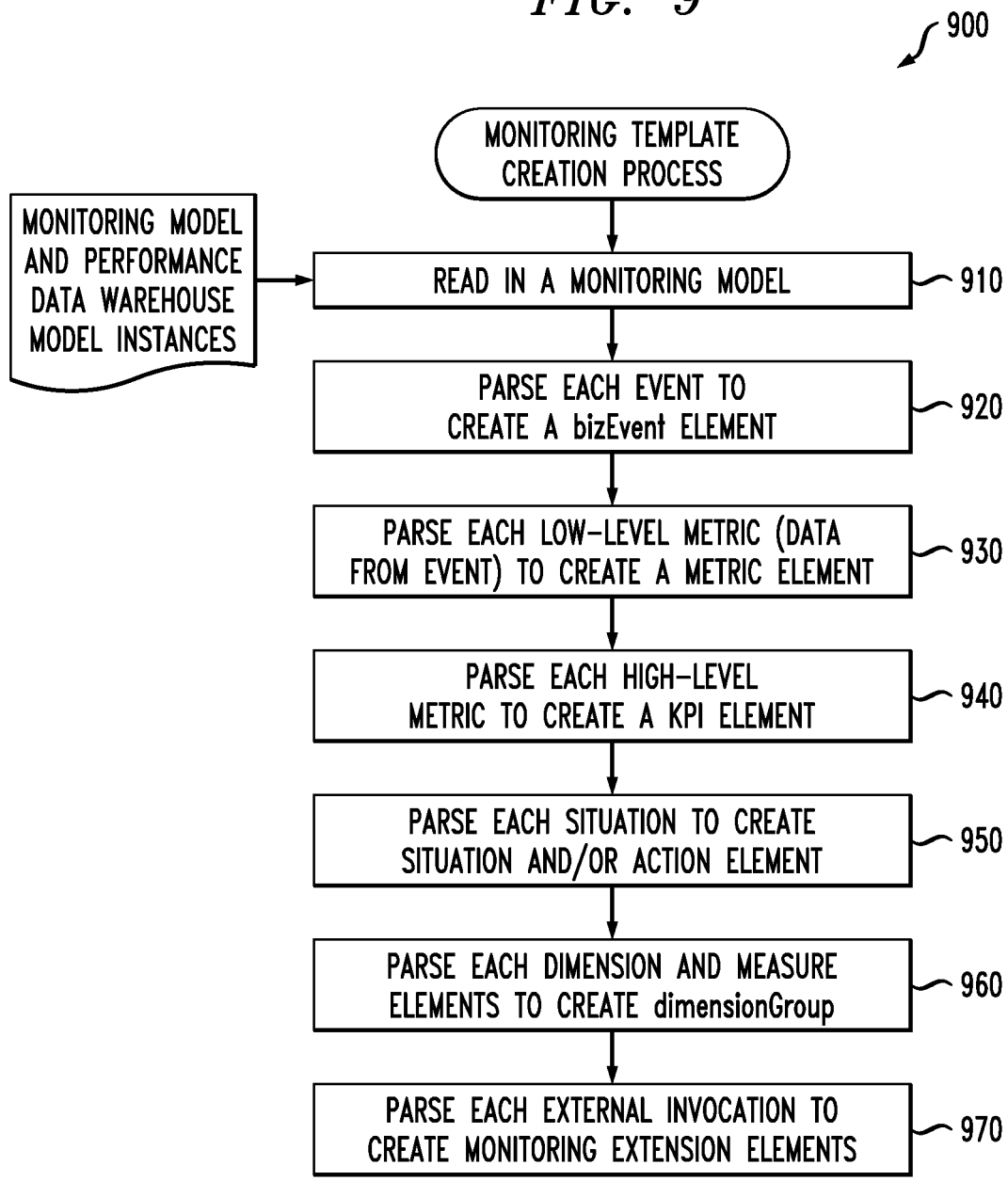
FIG. 9 is a flow chart describing an exemplary implementation of a monitoring template creation process incorporating features of the present invention.

FIG. 9 is a flow chart describing an exemplary implementation of a monitoring template creation process 900 incorporating features of the present invention. Generally, the monitoring template creation process 900 creates monitoring templates from existing monitoring models. As shown in FIG. 9, the monitoring template creation process 900 initially reads in a monitoring model during step 910, for example, from monitoring model and performance data warehouse model instances.

During step 920, the monitoring template creation process 900 parses each event to create a bizEvent element 610. During step 930, the monitoring template creation process 900 parses each low-level metric (data from event) to create a metric element 620.

During step 940, the monitoring template creation process 900 parses each high-level metric to create a KPI element 630. During step 950, the monitoring template creation process 900 parses each situation to create a situation and/or action element 640.

During step 960, the monitoring template creation process 900 parses each dimension and measure elements to create a dimensionGroup 650. Finally, during step 970, the monitoring template creation process 900 parses each external invocation to create monitoring extension elements 530.

Figure 10:
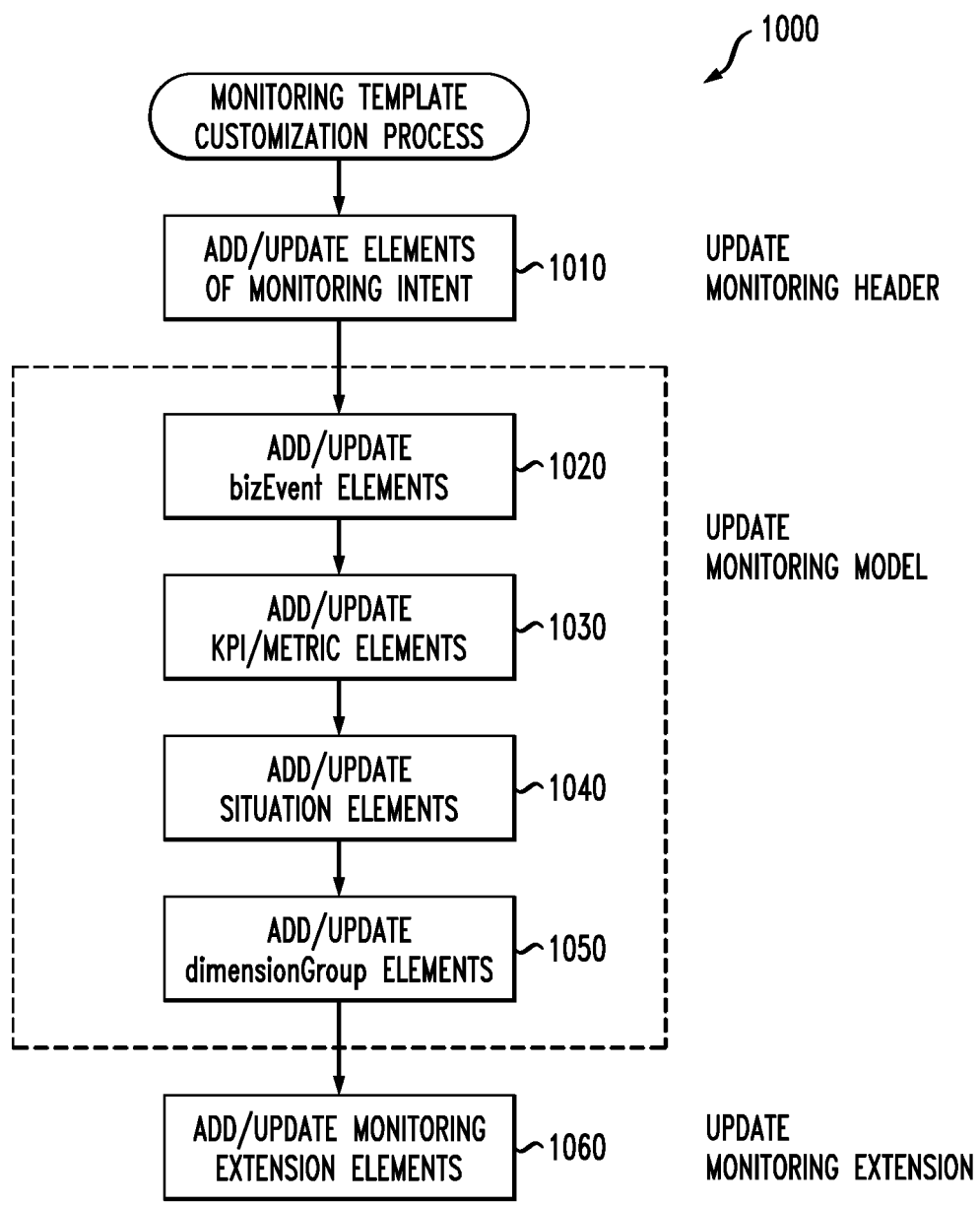
FIG. 10 is a flow chart describing an exemplary implementation of a monitoring template customization process incorporating features of the present invention.

FIG. 10 is a flow chart describing an exemplary implementation of a monitoring template customization process 1000 incorporating features of the present invention. Generally, the monitoring template customization process 1000 customizes monitoring templates for reuse. As shown in FIG. 10, the monitoring template customization process 1000 initially updates the monitoring header during step 1010 by adding and/or updating elements of monitoring intent.

During steps 1020 through 1050, the monitoring template customization process 1000 updates the monitoring model. During step 1020, the monitoring template customization process 1000 adds and/or updates the bizEvent elements 610. During step 1030, the monitoring template customization process 1000 adds and/or updates the KPI/metric elements 630. During step 1040, the monitoring template customization process 1000 adds and/or updates the situation elements 640. During step 1050, the monitoring template customization process 1000 adds and/or updates the dimensionGroup elements 650. During step 1060, the business performance monitoring system 100 updates the monitoring extension by adding and/or updating the monitoring extension elements 530.

Figure 11:
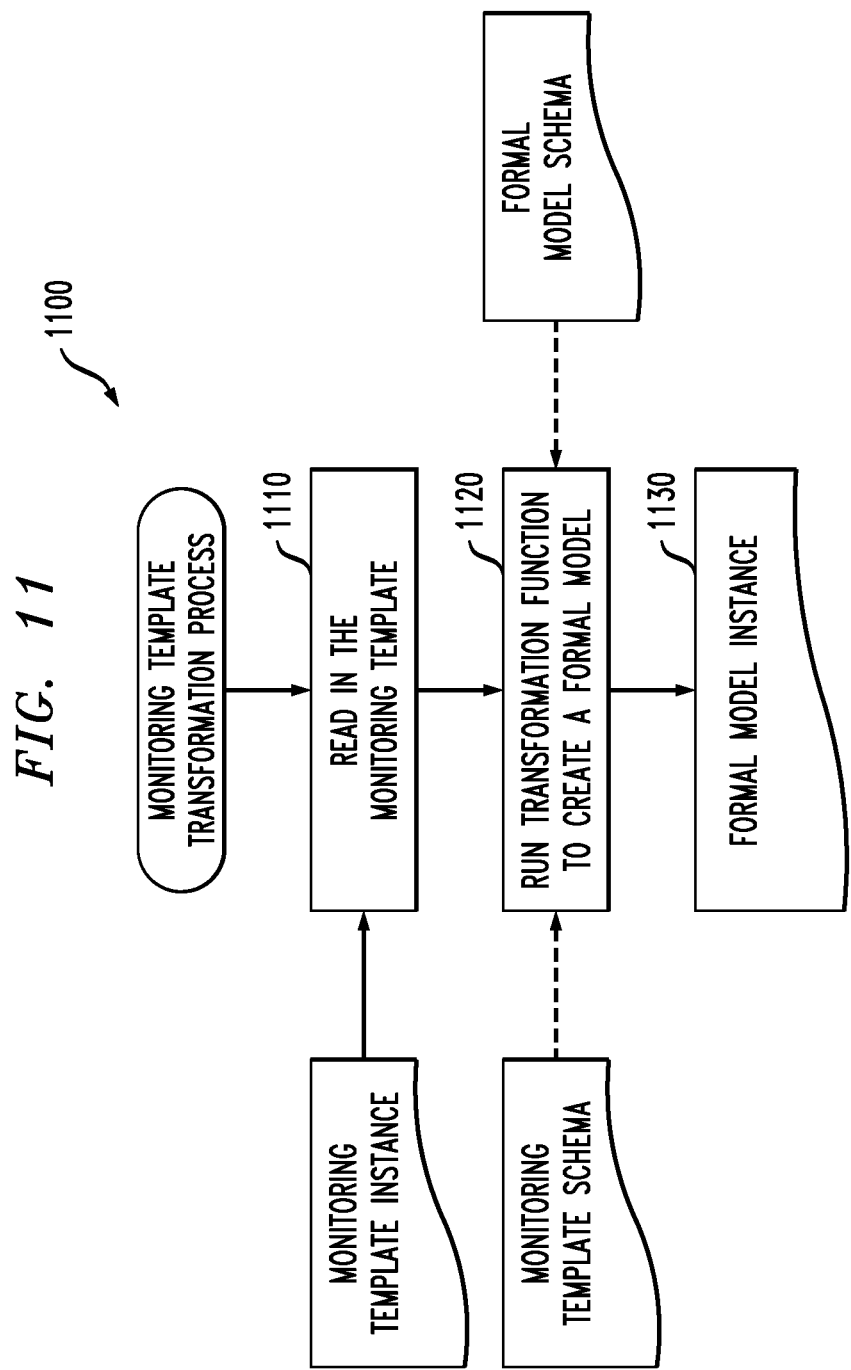
FIG. 11 is a flow chart describing an exemplary implementation of a monitoring template transformation process incorporating features of the present invention.

FIG. 11 is a flow chart describing an exemplary implementation of a monitoring template transformation process 1100 incorporating features of the present invention. Generally, the monitoring template transformation process 1100 transforms monitoring templates into formal models. As shown in FIG. 11, the monitoring template transformation process 1100 initially reads in the monitoring template from instances during step 1110. The monitoring template transformation process 1100 runs a transformation function during step 1120 to create a formal model, using monitoring template schema and formal model schema. A Formal model instance is generated during step 1130.

For example, the following exemplary XSLT rules can be applied during step 1120 to transform monitoring templates into formal models: for each bizEvent element 610, generate a definition for the event definition (e.g., Inbound event);

for each metric element 620, generate a metric definition with expression to extract data from an event source;

for each KPI element 630, generate an extended metric definition including, computation expression, result, gating condition, evaluation interval and externalized services;

for each situation element 640, generate "situation" definition;

for each dimensionGroup element 650;

for each dimension element in a dimensionGroup, generate dimension definition;

for each measure element in a measure group, generate measure definition as well as generate measureDimensionLink for each Dimension in the dimensionGroup. Each measureDimensionLink indicates the connection of a Dimension definition to the measure definition; and for each call-outService, generate service call, e.g. Web Service, with the service name, a set of parameters, return value, and protocol for the call.

Monitoring Intent

As previously indicated, the present invention provides a monitoring intent mechanism for describing existing business processes and/or corresponding monitoring models. As discussed hereinafter, when a monitoring intent is provided for a new or existing business process or for a monitoring template, the monitoring intent allows a user to search for relevant business processes and/or corresponding monitoring models. As used herein, a monitoring intent captures important monitoring requirements of a business process. In one exemplary embodiment, the monitoring intent is agnostic of the methodology a business process is created in.

In one exemplary embodiment, the monitoring intent comprises a multi-layer description and one or more contextual keywords. The exemplary monitoring intent description comprises a plurality of layers, such as top, middle, and bottom layers. Each layer in the exemplary monitoring intent hierarchy can contain an additional hierarchy within the layer. For example, the top layer expresses high level business direction and can broadly include, for example, business vision, strategy, objectives and policy. The middle layer links the top and bottom layers and can include, for example, a Balanced Scorecard (BSC) (see, e.g., http://www.balancedscorecard.org/BSCResources/AbouttheBalancedScorecard/tabid/55/Default.aspx) perspective and one or more strategy areas as defined by a strategy map (see, e.g., http://www.valuebasedmanagement.net/methods strategy maps strategic communicatio n.html). The bottom layer typically specifies atomic elements, such as KPIs that are organizational specific or based on a standard (such as American Productivity and Quality Center ("APQC"). The bottom layer could also be other user-defined elements that could track and indicate the progress toward organizational goals.

Likewise, the monitoring intent contextual keywords comprise a set of keywords in one or more categories, for example, using name/values pair, where values can optionally be multiple and separated by commas ','. For example, in the exemplary embodiment, keyword categories include "sector" (such as healthcare); "industry" such as life sciences); "process" (such as task-based processes, e.g., process=SalesOrderProcess); "roles" (such as role-based processes, roles="SalesExec, MarketingExec"); "artifacts" (such as artifact-based processes, e.g., artifact="ServiceOrder, ServiceOrderTask"); "industryStandard" (such as "APQC"); and optionally, additional "user-defined keywords" (such as Service Catalog).

Figure 12:
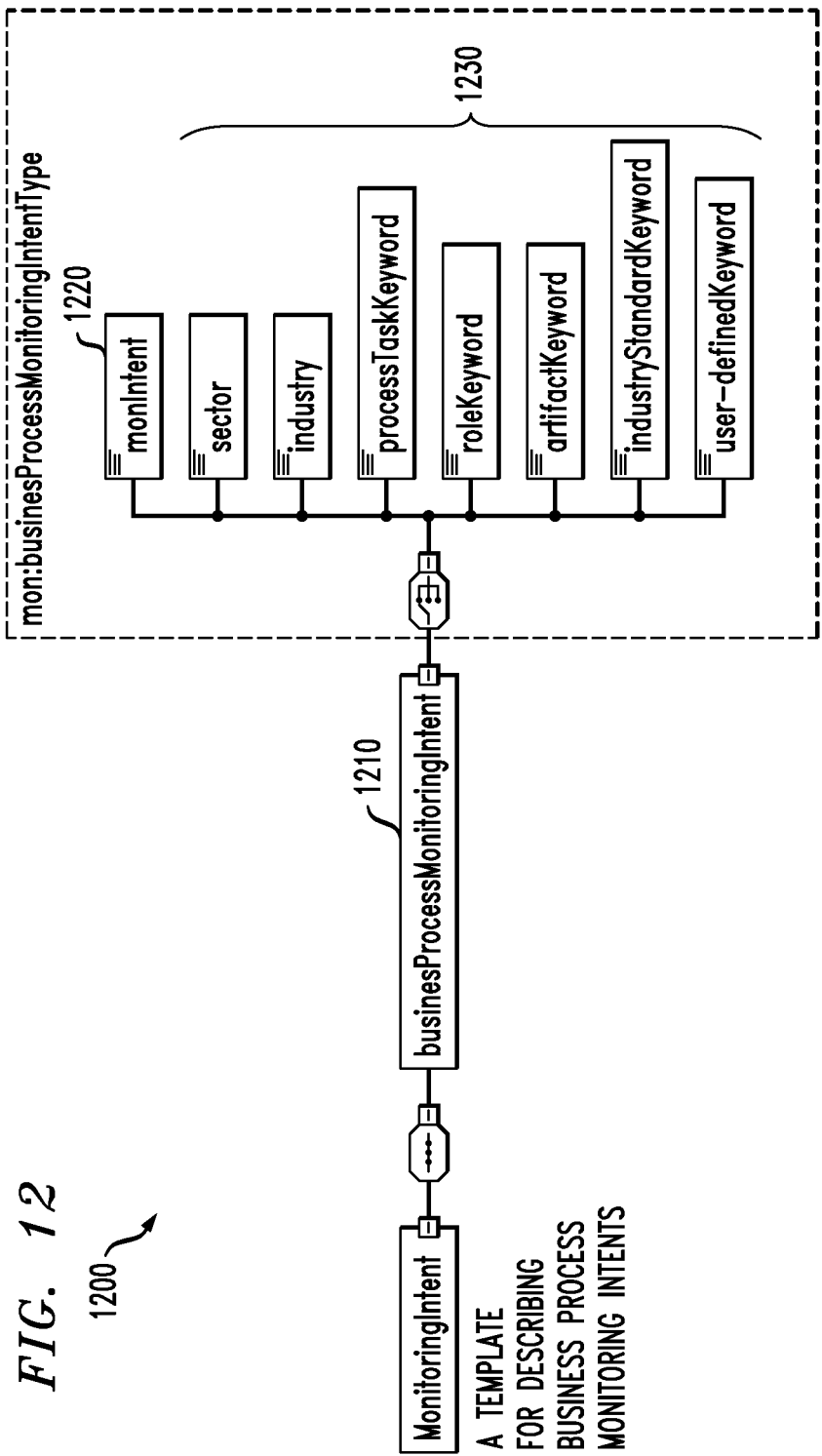
FIG. 12 illustrates an exemplary monitoring intent schema definition for recording monitoring intent in accordance with an aspect of the present invention.

FIG. 12 illustrates an exemplary monitoring intent schema definition 1200 for recording monitoring intent in accordance with an aspect of the present invention. As shown in FIG. 12, the exemplary monitoring intent schema definition 1200 comprises the monitoring intent description 1220 and one or more contextual keywords 1230. As indicated above, the contextual keywords 1230 in the exemplary embodiment comprise sector, industry, process task, role, artifact, industry standard and user-defined keywords.

Figure 13:
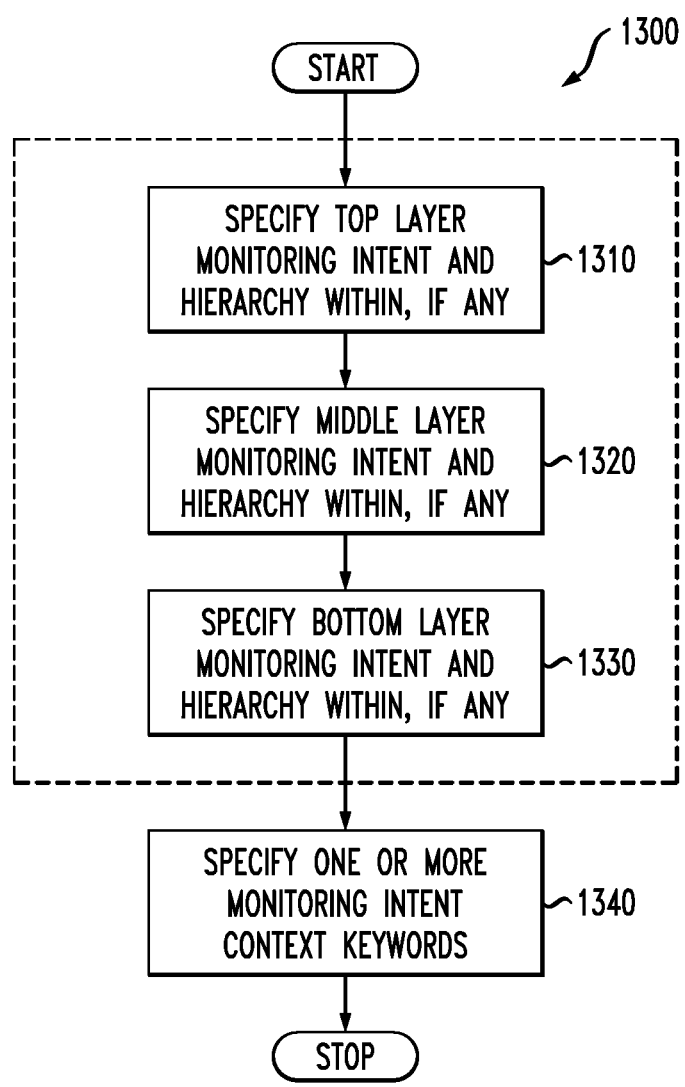
FIG. 13 is a flow chart describing an exemplary overall flow of the monitoring intent methodology.

FIG. 13 is a flow chart describing an exemplary overall flow of the monitoring intent methodology 1300. As shown in FIG. 13, the monitoring intent methodology 1300 initially optionally specifies the multi-layered monitoring intent definition during steps 1310 through 1330. In particular, during step 1310, the user specifies a top layer monitoring intent and any hierarchy within the top layer. Thereafter, during step 1320, the user specifies a middle layer monitoring intent and any hierarchy within the middle layer. Finally, during step 1330, the user specifies a bottom layer monitoring intent and any hierarchy within the bottom layer. In addition, during step 1340, the user specifies one or more monitoring intent contextual keywords.

The monitoring intent information collected using the monitoring intent methodology 1300 is recorded in one or more data records based on the monitoring intent schema definition 1200 of FIG. 12.

Figure 14:
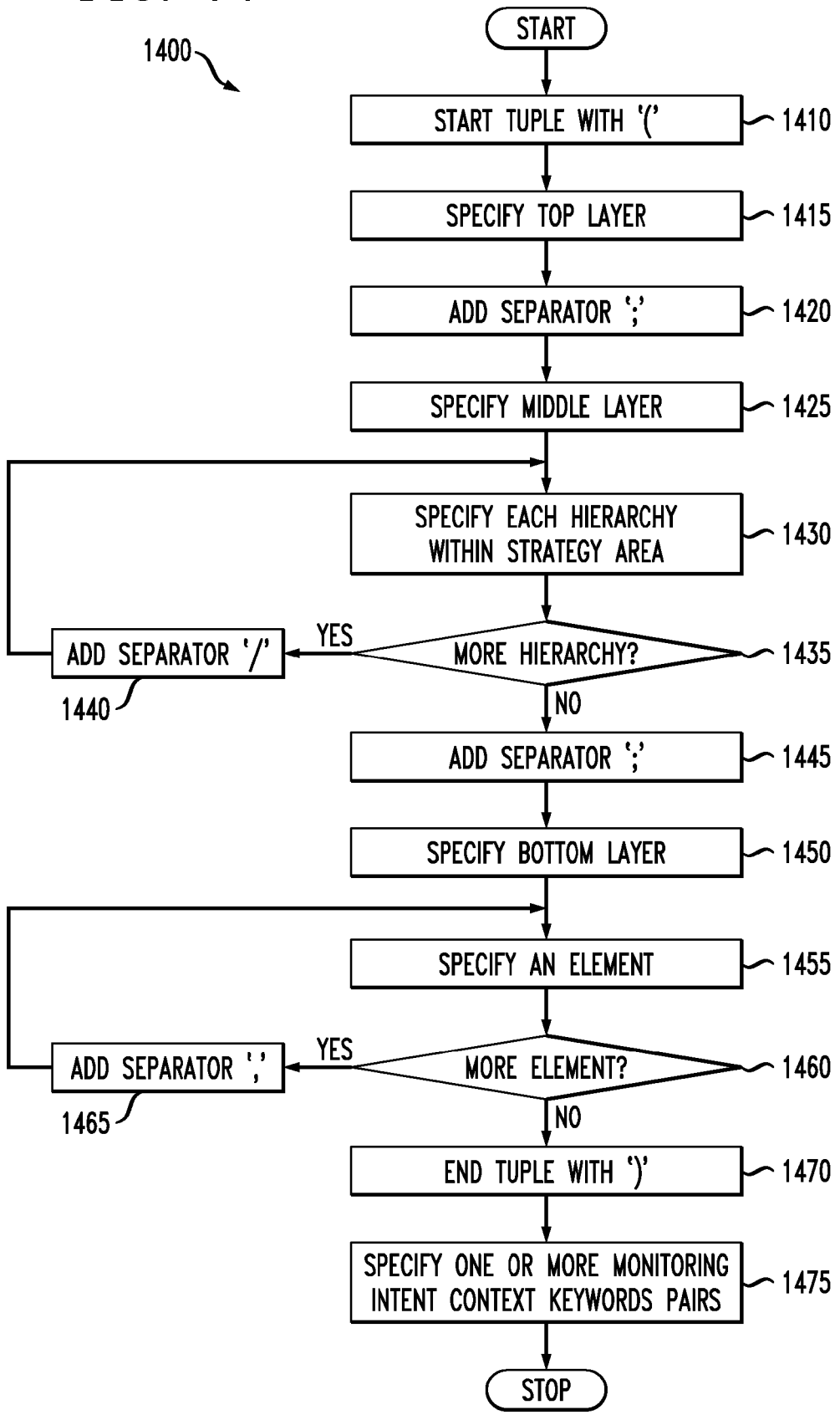
FIG. 14 is a flow chart describing an exemplary implementation of a monitoring intent description process.

FIG. 14 is a flow chart describing an exemplary implementation of a monitoring intent description process 1400. The exemplary monitoring intent description process 1400 is based on a number of exemplary expression rules for the multi-layered monitoring intent. A monitoring intent hierarchy comprises one or more layers, e.g., top, middle, or low, and the layers are expressed in terms of n-tuples (i.e., a sequence of n-elements, denoted by an enclosing pair of notation, e.g., "( )". Each hierarchy layer constitutes a tuple in the expression. Each tuple is separated by a first separator, e.g., a semicolon ';'. A hierarchy within each tuple is permitted, e.g., one or more hierarchies. A hierarchy within a tuple is separated by a second separator, e.g., a comma ','. Each hierarchy in a tuple comprises one or more elements. A third separator, such as a slash V', is used to separate elements within one hierarchy. For example, the monitoring intent can be expressed as follows:

(elem11; elem21/elem22, elem23/elem24; elem31, elem32, elem . . . )

Thus, as shown in FIG. 14, the exemplary monitoring intent description process 1400 initially starts a tuple during step 1410 with an open parenthesis '('. Thereafter, during step 1415, the top layer is specified (following middle layer specification if a hierarchy within exists). For example, the business goals, visions and strategies of the enterprise can be recorded in the top layer. A separator (such as ';') is added during step 1420.

The middle layer is specified during step 1425. If there is a hierarchy within the middle layer, it is specified during step 1430. For example, the BSC perspectives and strategy can optionally be recorded in the middle layer. A test is performed during step 1435 to determine if there is any more hierarchy to be specified. If it is determined during step 1435 that there is more hierarchy to be specified, then a separator (T) is added during step 1440 and program control returns to step 1430. If, however, it is determined during step 1435 that there is no more hierarchy to be specified, then a separator (';') is added during step 1445 and program control proceeds to step 1450.

During step 1450, the bottom layer is specified (following middle layer specification if a hierarchy within exists). One or more elements, such as KPIs, are specified during step 1455. A test is performed during step 1460 to determine if there are more elements to process. If it is determined during step 1460 that there are more elements to process, then a separator ',' is added during step 1465 and program control returns to step 1455. If, however, it is determined during step 1460 that there are no more elements to process, then the tuple is completed during step 1470 by ending it with a closing parenthesis ')'.

One or more monitoring intent context keywords pairs are then specified during step 1475. For example, the monitoring intent context keywords can comprise sector, industry, process, role, artifacts, standards, and any additional user-defined keywords.

FIG. 15 illustrates an exemplary data record 1500 for a financial business process that records a monitoring intent as part of a monitoring template in accordance with the present invention. The exemplary data record 1500 is based on the exemplary monitoring template schema definition 500 of FIG. 5 and the exemplary monitoring intent schema definition 1200 of FIG. 12.

As shown in FIG. 15, the optional monitoring header field 1510 has been populated with the monitoring intent of the monitoring template. The various sub-fields 1530 within the monitoring intent field 1520 are populated with the monitoring intent hierarchy description in sub-field 1540 using the above expression rules and additional exemplary contextual keywords are recorded in the corresponding sub-fields.

Figure 16C:
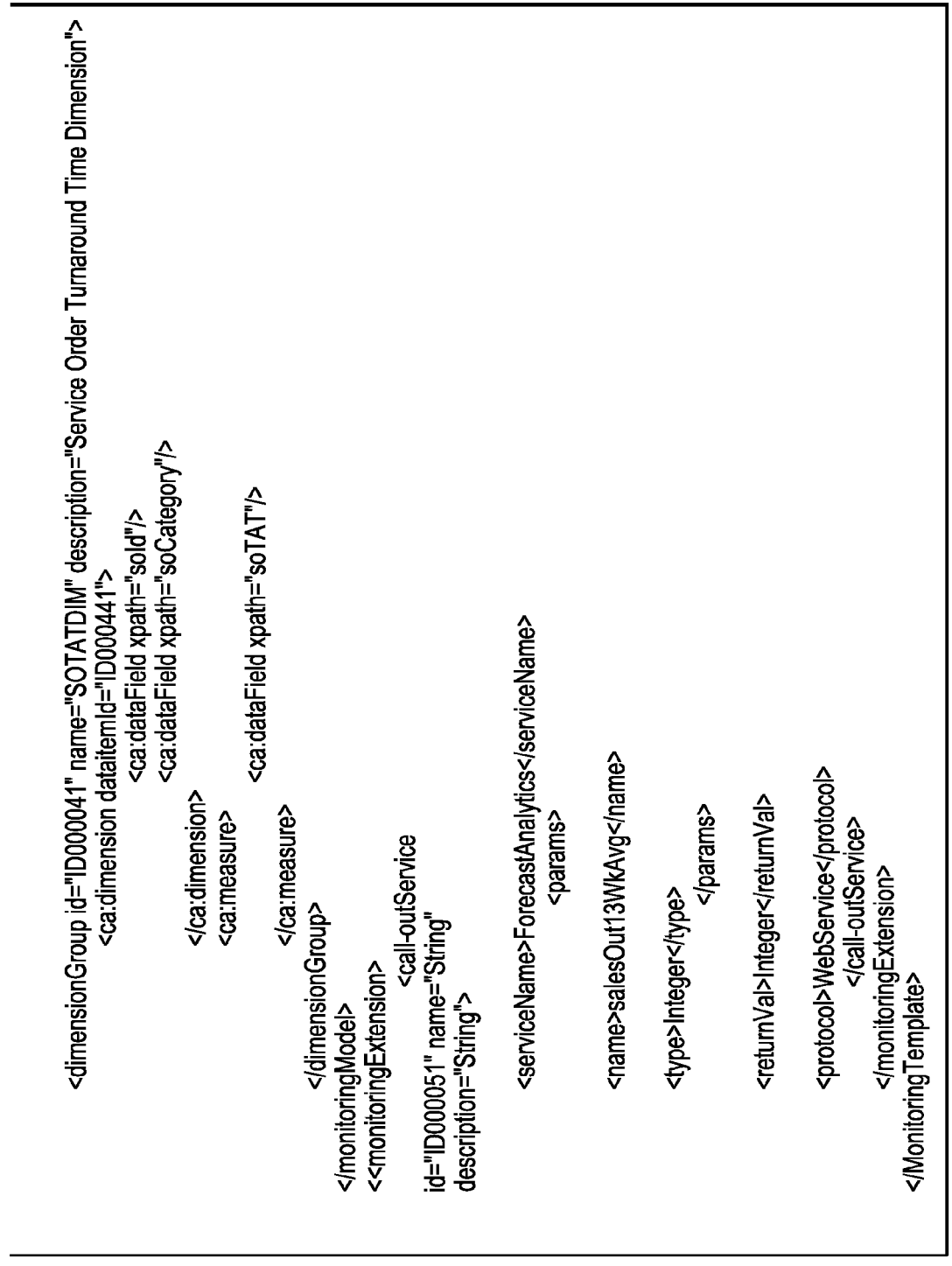

FIGS. 16A through 16C, collectively, illustrate an exemplary data record 1600 for a business process management template using XML. The exemplary data record 1600 is based on the exemplary monitoring template schema definition 500 of FIG. 5 and the exemplary monitoring intent schema definition 1200 of FIG. 12. As shown in FIG. 16A, the monitoring intent hierarchy description is specified in the monIntent field 1610 and one or more contextual keywords are specified in a collection of corresponding fields 1620.

As shown in FIG. 16A, the exemplary monitoring model element comprises a business event element 1630 to define one or more events. As shown in FIG. 16B, the exemplary monitoring model element also comprises a metric element 1635, a KPI element 1640, a situation element 1645 and a dimensions group element 1650. Within the dimensions group element 1650, a number of measures are defined. For each measure in the measure group, a measureDimensionLink is created for each Dimension. The monitoring extension element 1660 is specified in FIG. 16C.

Monitoring Intent to Match Monitoring Models and Business Processes

Figure 17:
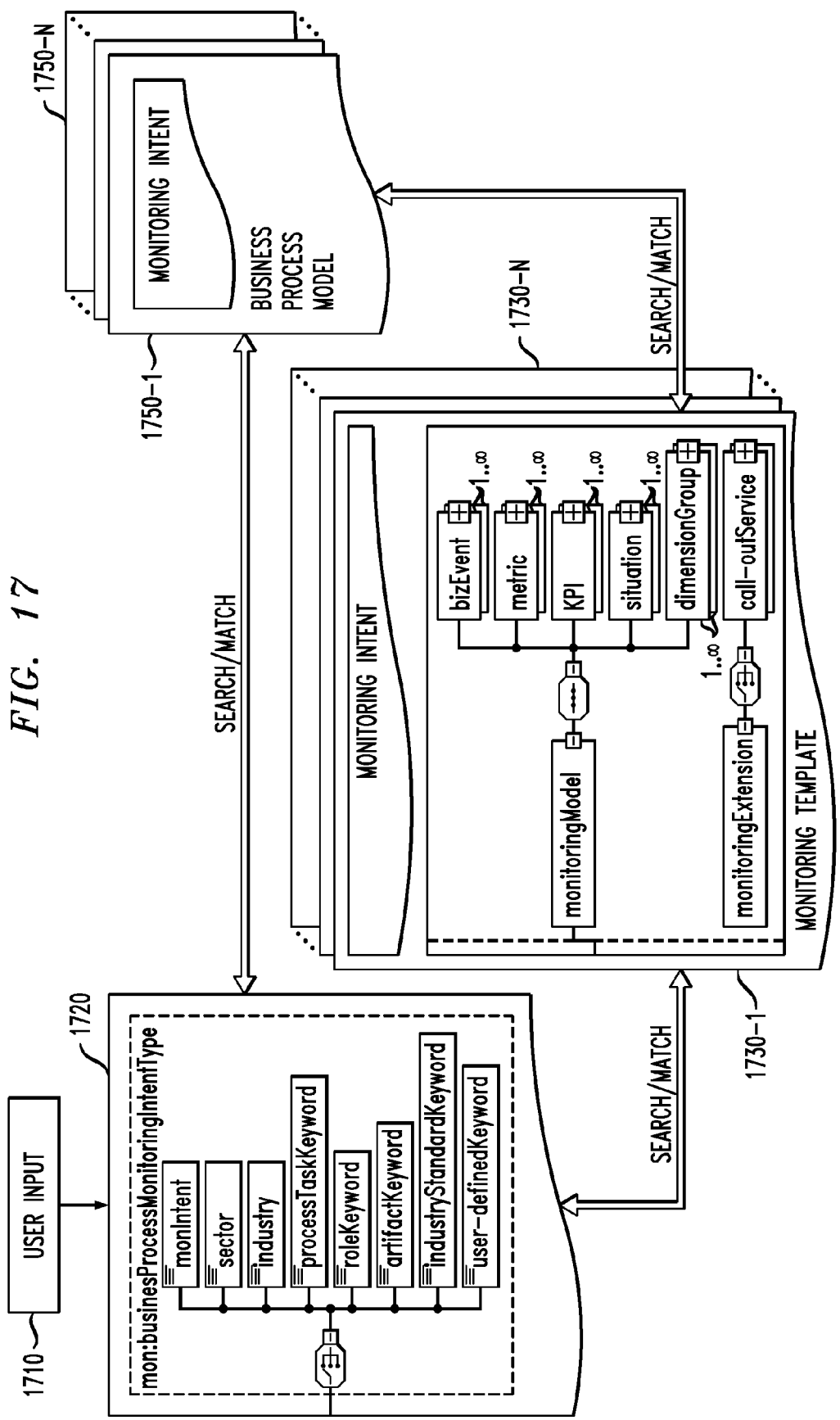
FIG. 17 illustrates the matching of monitoring templates and/or business processes using monitoring intents.

The present invention also provides methods and apparatus for searching and matching monitoring models and business processes by matching monitoring intents. FIG. 17 illustrates the matching of monitoring templates and/or business processes using monitoring intents. As shown in FIG. 17, a user can provide a user input 1710 specifying a monitoring Intent, such as search criteria and one or more industry standard keywords. The user input 1710 is formatted and recorded in a data record 1720 using the exemplary monitoring intent schema definition 1200 of FIG. 12. As discussed hereinafter, the data record 1720 can be compared to existing monitoring templates 1730-1 through 1730-N that include a monitoring intent and/or existing business processes 1750-1 through 1750-N having a monitoring intent.

Thus, a given source business process monitoring intent can be matched with a set of target monitoring intent-enabled business processes and/or with monitoring intent-enabled monitoring templates to produce a ranked list of matched business processes and/or monitoring templates, for example, in descending order of the total score. The given source monitoring intent and target monitoring intent can be processed as discussed herein to be in a format that can be searched. If there are matches between the source and target, weights are optionally assigned to each of the matched sub-elements to produce a sub-total score. The sub-totals can be summed to produce a total score for each target.

Matching can be performed, for example, using a standalone monitoring intent expressed via user search criteria, new or existing monitoring intent-enabled monitoring templates that contain a monitoring intent element and new or existing monitoring intent-enabled business processes that contain a monitoring intent element.

In one exemplary embodiment, discussed herein, a routine will process monitoring intent into key-word based 'search parameters' by parsing each monitoring intent element into key words to enable the matching and scoring. Initially, the exemplary routine will look for an exact match. If there are no exact matches, a prior art technique, such as ontology, can be employed for semantic matching with synonyms or partial matches. In one exemplary implementation, a partial match can be assigned half the score of an exact match. The total score is the sum of each of the scores of an exact match or a partially matched keyword.

Figure 18:
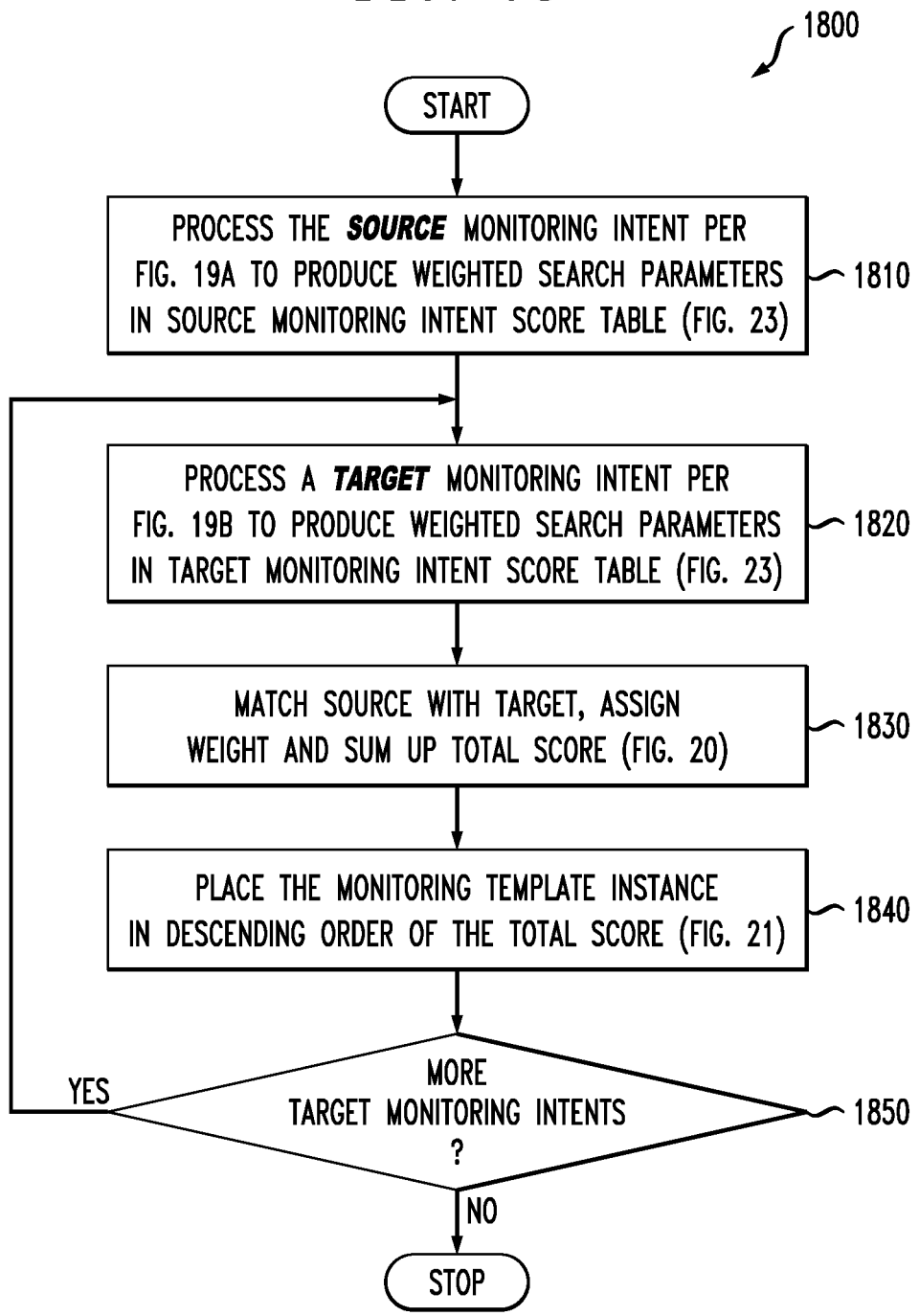
FIG. 18 is a flow chart illustrating an exemplary monitoring intent matching process incorporating features of the present invention.
Figure 19:
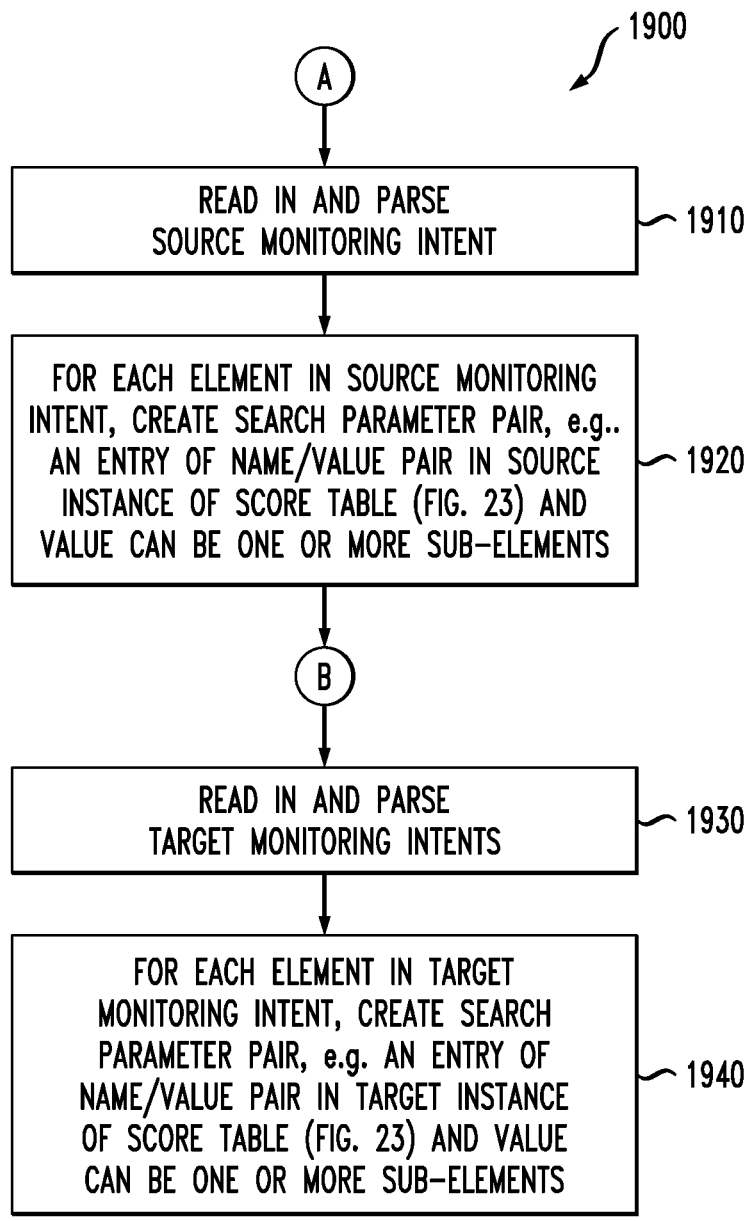
FIGS. 19A and 19B, collectively, are a flow chart illustrating the processing of reading and parsing source and target monitoring intents, respectively.

FIG. 18 is a flow chart illustrating an exemplary monitoring intent matching process 1800 incorporating features of the present invention. As shown in FIG. 18 and as discussed further below in conjunction with FIG. 19A, the exemplary monitoring intent matching process 1800 initially processes the source monitoring intent (user input 1710) during step 1810 to produce weighted search parameters in a source monitoring intent score table, discussed further below in conjunction with FIG. 23.

As discussed further below in conjunction with FIG. 19B, the exemplary monitoring intent matching process 1800 then processes a target monitoring intent to produce weighted search parameters in a target monitoring intent score table, discussed further below in conjunction with FIG. 23.

During step 1830, the exemplary monitoring intent matching process 1800 matches the source with the target, assigns a weight and sums up the total score, as discussed further below in conjunction with FIG. 20. During step 1840, the exemplary monitoring intent matching process 1800 places the monitoring template instance in descending order of the total score, as discussed further below in conjunction with FIG. 21.

A test is performed during step 1850 to determine if there are more target monitoring intents to process. If it is determined during step 1850 that there are more target monitoring intents to process, then program control returns to step 1820 and continues in the manner described above. If, however, it is determined during step 1850 that there are not more target monitoring intents to process, then program control terminates.

FIGS. 19A and 19B, collectively, are a flow chart illustrating the processing of source and target monitoring intents, respectively. As shown in FIG. 19A, the source monitoring intent is processed by initially reading in and parsing the source monitoring intent during step 1910. Thereafter, during step 1920, for each element in the source monitoring intent, a search parameter pair is created, e.g., an entry of a name/value pair in the source instance of the score table (FIG. 23) and the value can be one or more sub-elements.

As shown in FIG. 19B, the target monitoring intent is processed by initially reading in and parsing the target monitoring intent during step 1930. Thereafter, during step 1940, for each element in the target monitoring intent, a search parameter pair is created, e.g., an entry of a name/value pair in the target instance of the score table (FIG. 23) and the value can be one or more sub-elements.

Figure 20:
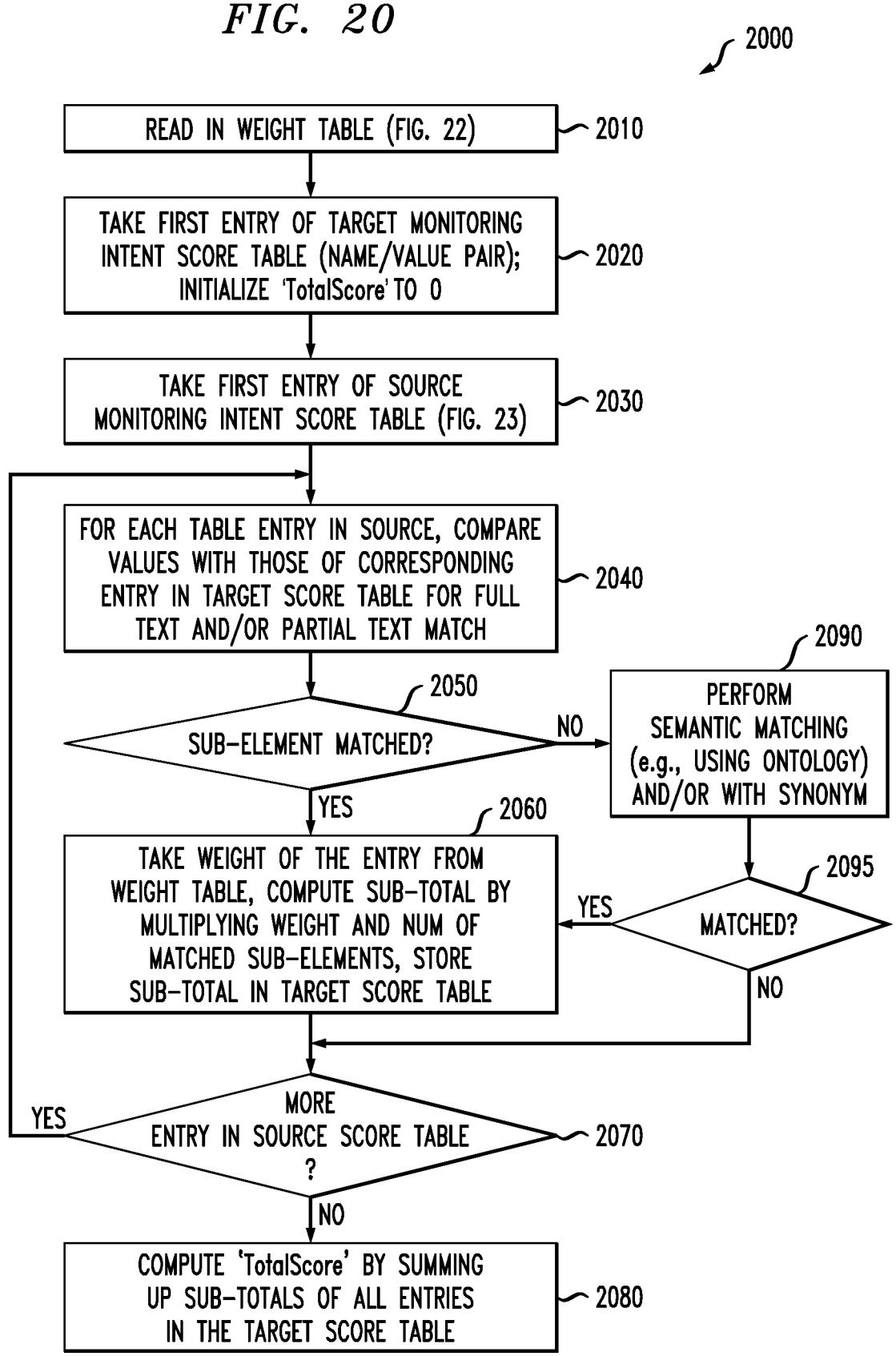
FIG. 20 is a flow chart illustrating an exemplary implementation of a match scoring process incorporating features of the present invention.

FIG. 20 is a flow chart illustrating an exemplary implementation of a match scoring process 2000 incorporating features of the present invention. As shown in FIG. 20, the exemplary match scoring process 2000 initially reads in the weight table, such as the exemplary weight table 2200 discussed further below in conjunction with FIG. 22, during step 2010.

Thereafter, during step 2020, the match scoring process 2000 takes the first entry of the target monitoring intent score table (a name/value pair) and initializes a variable that holds the total score, e.g. 'TotalScore', to 0. During step 2030, the match scoring process 2000 takes the first entry of the source monitoring intent score table (a name/value pair), and during step 2040, for each table entry in the source, the process 2000 compares values with those of corresponding entry in the target score table for full text and/or partial text match.

A test is performed during step 2050 to determine if a sub-element matched. If it is determined during step 2050 that a sub-element matched, then the corresponding weight of the entry is taken during step 2060 from the exemplary weight table of FIG. 22, the sub-total is computed by multiplying the weight and number of matched sub-elements, and the sub-total is stored in the exemplary score table of FIG. 23. Program control then proceeds to step 2070, discussed below. If, however, it is determined during step 2050 that a sub-element did not match, then program control proceeds to step 2090, where a prior art technique, such as an ontology, is used to do semantic match and/or with synonyms.

A test is performed during step 2095 to determine if the test is matched. If it is determined during step 2095 that the test is matched, then program control proceeds to step 2060, discussed above. If, however, it is determined during step 2095 that the test did not match, then program control proceeds to step 2070.

During step 2070, a further test is performed to determine if there are any more entries in the source score table. If it is determined during step 2070 that there are any more entries in the source score table, then program control returns to step 2040 and continues in the manner described above. If, however, it is determined during step 2070 that there are not any more entries in the source score table, then the value of total score, e.g. in the variable TotalScore, is computed during step 2080 by summing up the sub-totals of all entries in the target score table.

Figures 21, 22:
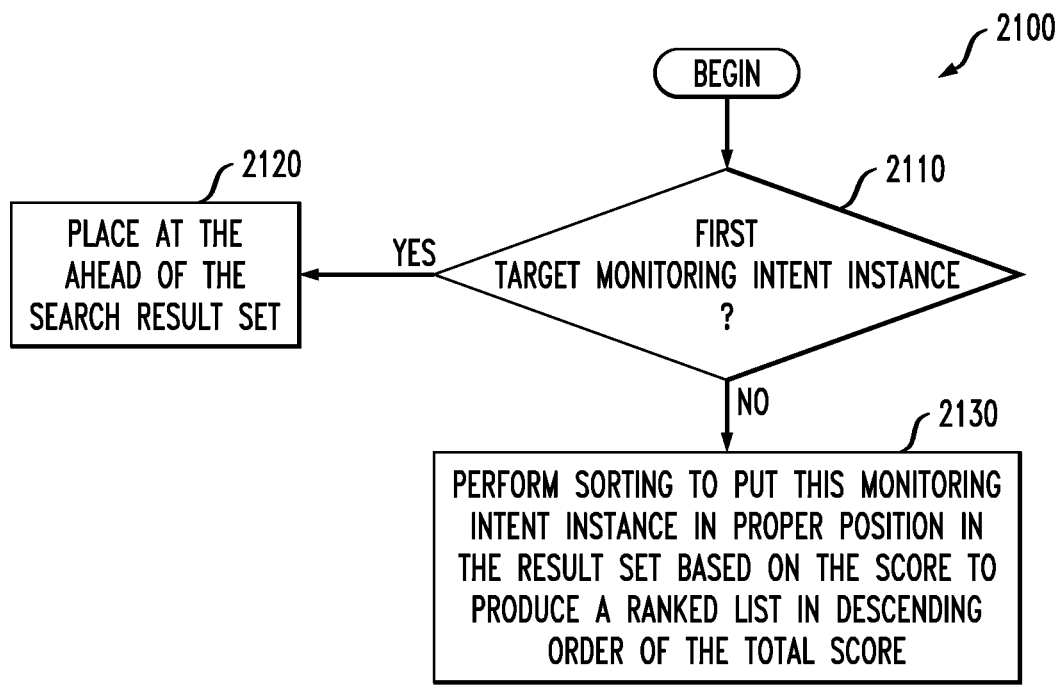
FIG. 21 is a flow chart illustrating an exemplary implementation of a match sorting process incorporating features of the present invention.
FIG. 22 is an exemplary monitoring intent weight table.

FIG. 21 is a flow chart illustrating an exemplary implementation of a match sorting process 2100 incorporating features of the present invention. As shown in FIG. 21, a test is initially performed during step 2110 to determine if the record being processed is the first target monitoring intent instance. If it is determined during step 2110 that the record being processed is the first target monitoring intent instance, then the record is placed at the ahead of the search result set during step 2120. If, however, it is determined during step 2110 that the record being processed is not the first target monitoring intent instance, then a sorting is performed during step 2130 to put this monitoring intent instance in proper position in the result set based on the score to produce a ranked list in descending order of the total score (using a sorting algorithm of choice).

FIG. 22 is an exemplary monitoring intent weight table 2200. As shown in FIG. 22, the exemplary monitoring intent weight table 2200 records a weight for each element of the exemplary monitoring intent schema definition 1200 of FIG. 12.

Figures 23, 24:
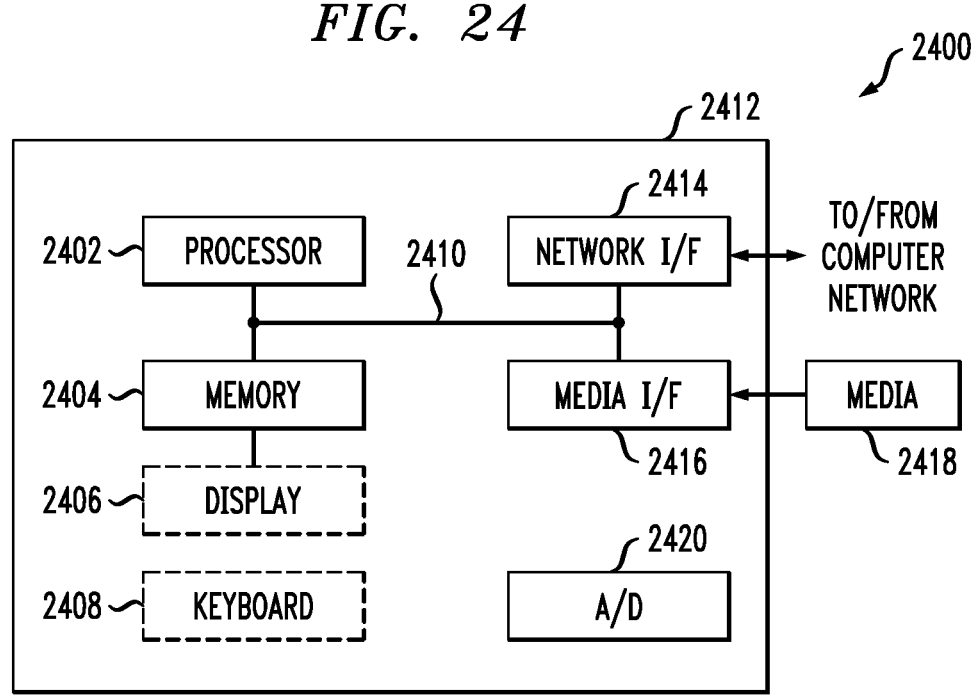
FIG. 23 is an exemplary monitoring intent score table.
FIG. 24 depicts a computer system that can implement one or more aspects and/or elements of the present invention.

FIG. 23 is an exemplary monitoring intent score table 2300. As shown in FIG. 23, the exemplary monitoring intent score table 2300 records, for element (e.g., identified by name) of the exemplary monitoring intent schema definition 1200 of FIG. 12, the value (one or more from the element), and sub-totals (Weights/Scores) for full and partial matches where each sub-total of a row in the table is computed as the sum of 1) number of matched values multiplied by the corresponding weights/score in the Weight table, and 2) number of partially matched values multiplied by the corresponding partial weights/score in the Weight table, Exemplary System and Article of Manufacture Details As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. FIG. 24 depicts a computer system 2400 that may be useful in implementing one or more aspects and/or elements of the present invention. With reference to FIG. 24, such an implementation might employ, for example, a processor 2402, a memory 2404, and an input/output interface formed, for example, by a display 2406 and a keyboard 2408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 2402, memory 2404, and input/output interface such as display 2406 and keyboard 2408 can be interconnected, for example, via bus 2410 as part of a data processing unit 2412. Suitable interconnections, for example via bus 2410, can also be provided to a network interface 2414, such as a network card, which can be provided to interface with a computer network, and to a media interface 2416, such as a diskette or CD-ROM drive, which can be provided to interface with media 2418.

Analog-to-digital converter(s) 2420 may be provided to receive analog input, such as analog video feed, and to digitize same. Such converter(s) may be interconnected with system bus 2410.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2402 coupled directly or indirectly to memory elements 2404 through a system bus 2410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 2408, displays 2406, pointing devices, and the like) can be coupled to the system either directly (such as via bus 2410) or through intervening I/O controllers (omitted for clarity).

Network adapters such as network interface 2414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 2412 as shown in FIG. 24) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 2418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 2402. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for identifying one or more of a plurality of enterprise-level business processes of an enterprise and a plurality of monitoring templates, said method comprising:
    obtaining, using at least one device, at least one of said plurality of enterprise-level business processes and said plurality of monitoring templates, wherein at least one of said obtained enterprise-level business processes and said obtained monitoring template has an associated monitoring intent comprising one or more monitoring keywords, wherein said monitoring intent links one or more business goals of said enterprise to a given enterprise-level business process such that said monitoring intent can be searched to identify at least one existing enterprise-level business process that is related to a new enterprise-level business process being created;
    obtaining, using at least one processing device, a user-specified monitoring intent from said user, said user-specified monitoring intent comprising one or more search keywords;
    assigning, using at least one processing device, a score to at least one of said obtained enterprise-level business process and said monitoring template, wherein said score is based on a matching of a semantic context of said associated monitoring intent and one or more of said monitoring keywords from said associated monitoring intent with a semantic context of said user-specified monitoring intent and said search keywords of said user-specified monitoring intent; and
    identifying, using at least one processing device, said one or more of said plurality of enterprise-level business processes and said plurality of monitoring templates based on said assigned score.

2. The method of claim 1, further comprising the step of generating a ranked list of said one or more of said plurality of enterprise-level business processes and said plurality of monitoring templates based on said score.

3. The method of claim 2, wherein said ranked list is presented in descending order of said assigned score.

4. The method of claim 1, further comprising the step of storing said one or more of said plurality of enterprise-level business processes and said plurality of monitoring templates in a format that can be searched.

5. The method of claim 1, wherein said plurality of enterprise-level business processes and said plurality of monitoring templates each have a plurality of keywords and wherein a weighted score is assigned to each of said plurality of keywords.

6. The method of claim 1, wherein said assigned score is based on a weighted score of matching keywords.

7. The method of claim 6, wherein a total score is a sum of weighted scores of said matching keywords.

8. The method of claim 6, wherein said matching keywords comprise exact matching keywords and partial matching keywords.

9. The method of claim 1, further comprising the step of assigning a score to a first of said monitoring templates, wherein said score is based on a matching of a semantic context of said first monitoring template and one or more monitoring keywords of said first monitoring template with a semantic context of a second of said monitoring templates and one or more monitoring keywords of said second monitoring template.

10. A computer program product for identifying one or more of a plurality of enterprise-level business processes of an enterprise and a plurality of monitoring templates, said computer program product comprising a tangible computer readable recordable storage medium having computer readable program code embodied therewith, said computer readable program code comprising:
  computer readable program code configured to obtain, using at least one processing device, at least one of said plurality of enterprise-level business processes and said plurality of monitoring templates, wherein at least one of said obtained enterprise-level business processes and said obtained monitoring template has an associated monitoring intent comprising one or more monitoring keywords, wherein said monitoring intent links one or more business goals of said enterprise to a given enterprise-level business process such that said monitoring intent can be searched to identify at least one existing enterprise-level business process that is related to a new enterprise-level business process being created;
  computer readable program code configured to obtain, using at least one processing device, a user-specified monitoring intent from said user, said user-specified monitoring intent comprising one or more search keywords;
  computer readable program code configured to assign, using at least one processing device, a score to at least one of said obtained enterprise-level business process and said monitoring template, wherein said score is based on a matching of a semantic context of said associated monitoring intent and one or more of said monitoring keywords from said associated monitoring intent with a semantic context of said user-specified monitoring intent and said search keywords of said user-specified monitoring intent; and
  computer readable program code configured to identify, using at least one processing device, said one or more of said plurality of enterprise-level business processes and said plurality of monitoring templates based on said assigned score.

11. The computer program product of claim 10, wherein said computer readable program code is further configured to generate a ranked list of said one or more of said plurality of enterprise-level business processes and said plurality of monitoring templates based on said score.

12. The computer program product of claim 11, wherein said ranked list is presented in descending order of said assigned score.

13. The computer program product of claim 10, wherein said computer readable program code is further configured to store said one or more of said plurality of enterprise-level business processes and said plurality of monitoring templates in a format that can be searched.

14. The computer program product of claim 10, wherein said plurality of enterprise-level business processes and said plurality of monitoring templates each have a plurality of keywords and wherein a weighted score is assigned to each of said plurality of keywords.

15. The computer program product of claim 10, wherein said assigned score is based on a weighted score of matching keywords.

16. The computer program product of claim 15, wherein a total score is a sum of weighted scores of said matching keywords.

17. The computer program product of claim 16, wherein said matching keywords comprise exact matching keywords and partial matching keywords.

18. The computer program product of claim 10, further comprising the step of assigning a score to a first of said monitoring templates, wherein said score is based on a matching of a semantic context of said first monitoring template and one or more monitoring keywords of said first monitoring template with a semantic context of a second of said monitoring templates and one or more monitoring keywords of said second monitoring template.

19. An apparatus for identifying one or more of a plurality of enterprise-level business processes of an enterprise and a plurality of monitoring templates, comprising:
  a memory; and
  at least one processing device, coupled to the memory, operative to:
  obtain, using said at least one processing device, at least one of said plurality of enterprise-level business processes and said plurality of monitoring templates, wherein at least one of said obtained enterprise-level business processes and said obtained monitoring template has an associated monitoring intent comprising one or more monitoring keywords, wherein said monitoring intent links one or more business goals of said enterprise to a given enterprise-level business process such that said monitoring intent can be searched to identify at least one existing enterprise-level business process that is related to a new enterprise-level business process being created;
  obtain, using said at least one processing device, a user-specified monitoring intent from said user, said user-specified monitoring intent comprising one or more search keywords;
  assign, using said at least one processing device, a score to at least one of said obtained enterprise-level business process and said monitoring template, wherein said score is based on a matching of a semantic context of said associated monitoring intent and one or more of said monitoring keywords from said associated monitoring intent with a semantic context of said user-specified monitoring intent and said search keywords of said user-specified monitoring intent; and
  identify, using said at least one processing device, said one or more of said plurality of enterprise-level business processes and said plurality of monitoring templates based on said assigned score.

20. The apparatus of claim 19, wherein said processor is further configured to generate a ranked list of said one or more of said plurality of enterprise-level business processes and said plurality of monitoring templates based on said score.

21. The apparatus of claim 20, wherein said ranked list is presented in descending order of said assigned score.

22. The apparatus of claim 19, wherein said processor is further configured to store said one or more of said plurality of enterprise-level business processes and said plurality of monitoring templates in a format that can be searched.

23. The apparatus of claim 19, wherein said plurality of enterprise-level business processes and said plurality of monitoring templates each have a plurality of keywords and wherein a weighted score is assigned to each of said plurality of keywords.

24. The apparatus of claim 19, wherein said assigned score is based on a weighted score of matching keywords.

25. The apparatus of claim 24, wherein a total score is a sum of weighted scores of said matching keywords.

26. The apparatus of claim 25, wherein said matching keywords comprise exact matching keywords and partial matching keywords.

27. The apparatus of claim 19, further comprising the step of assigning a score to a first of said monitoring templates, wherein said score is based on a matching of a semantic context of said first monitoring template and one or more monitoring keywords of said first monitoring template with a semantic context of a second of said monitoring templates and one or more monitoring keywords of said second monitoring template.

\* \* \* \* \*